(12) United States Patent
Burger

(10) Patent No.: US 12,487,380 B2
(45) Date of Patent: Dec. 2, 2025

(54) MODIFIED POLYMER WITH A SLIPPERY OMNIPHOBIC COVALENTLY ATTACHED LIQUID CHEMICALLY BONDED THERETO, METHOD OF MAKING THE SAME, LIQUID LENS INCORPORATING THE MODIFIED POLYMER AS AN INSULATING LAYER, AND LIQUID LENS WITH INSULATING LAYER HAVING HIGH QUALITY FACTOR USABLE UNDER DIRECT CURRENT

(71) Applicant: Corning Incorporated, Corning, NY (US)

(72) Inventor: Benjamin Jean-Baptiste Francois Burger, Lyons (FR)

(73) Assignee: CORNING INCORPORATED, Corning, NY (US)

( * ) Notice: Subject to any disclaimer, the term of this patent is extended or adjusted under 35 U.S.C. 154(b) by 727 days.

(21) Appl. No.: 17/862,478

(22) Filed: Jul. 12, 2022

(65) Prior Publication Data

US 2023/0099196 A1 Mar. 30, 2023

Related U.S. Application Data

(60) Provisional application No. 63/224,197, filed on Jul. 21, 2021.

(51) Int. Cl.
*G02B 3/14* (2006.01)
*C08G 61/02* (2006.01)
*G02B 26/00* (2006.01)

(52) U.S. Cl.
CPC ............ *G02B 3/14* (2013.01); *C08G 61/025* (2013.01); *G02B 26/004* (2013.01);
(Continued)

(58) Field of Classification Search
CPC ...... G02B 3/14; G02B 26/004; C08G 61/025; C08G 2261/11; C08G 2261/144;
(Continued)

(56) References Cited

U.S. PATENT DOCUMENTS 4,123,308 A  10/1978  Nowlin
7,791,814 B2  9/2010  Liogier et al.
(Continued)

FOREIGN PATENT DOCUMENTS

CN  106291912 B  12/2019
CN  111087899 A  5/2020
(Continued)

OTHER PUBLICATIONS

Huang et al. "A facile approach to fabricate dynamically omniphobic coating on diverse substrates for self-cleaning." Progress in Organic Coatings 132 (2019): 475-480. DOI: 10.1016/j.porgcoat.2019.04.019t. (Year: 2019).*

(Continued)

*Primary Examiner* — John D Freeman
(74) *Attorney, Agent, or Firm* — Yiqun Zhao

(57) ABSTRACT

A liquid lens including (i) a first liquid and a second liquid disposed within a containment region, the first liquid and the second liquid forming an interface between the first liquid and the second liquid; (ii) an electrode; and (iii) an insulating layer separating the electrode from the first liquid and the second liquid, the insulating layer comprising a polymeric material and a slippery omniphobic covalently attached liquid that is chemically bonded to the polymeric material, the slippery omniphobic covalently attached liquid providing a surface contacting one or more of the first liquid and the second liquid. The polymeric material of the insulating layer can be a poly(para-xylylene). The slippery omniphobic covalently attached liquid can include units of a silicone or (Continued)

polyolefin, each unit individually bound to a repeating unit of the polymeric material. A liquid lens where the insulating layer has a quality factor at least 200.

23 Claims, 8 Drawing Sheets

(52) U.S. Cl.
CPC .... *C08G 2261/11* (2013.01); *C08G 2261/144* (2013.01); *C08G 2261/726* (2013.01)

(58) Field of Classification Search
CPC ........ C08G 2261/726; C08G 2261/146; C08G 2261/20; C08G 2261/342; C08G 2261/3424
See application file for complete search history.

(56) References Cited

U.S. PATENT DOCUMENTS

| | | | |
|---|---|---|---|
| 7,791,815 | B2 | 9/2010 | Weikart et al. |
| 2007/0177276 | A1* | 8/2007 | Liogier D'ardhuy ........................ G02B 26/005 359/666 |
| 2013/0050807 | A1 | 2/2013 | Lee et al. |
| 2015/0124311 | A1 | 5/2015 | Berge et al. |

FOREIGN PATENT DOCUMENTS

| | | |
|---|---|---|
| EP | 1816491 A1 | 8/2007 |
| WO | 2011/083043 A1 | 7/2011 |
| WO | 2013/156865 A1 | 10/2013 |
| WO | WO-2020041409 A1 * | 2/2020 .............. B05D 3/02 |

OTHER PUBLICATIONS

Yu et al. "Patternable poly (chloro-p-xylylene) film with tunable surface wettability prepared by temperature and humidity treatment on a polydimethylsiloxane/silica coating." Materials 11.4 (2018): 486. DOI: 10.3390/ma11040486. (Year: 2018).*

Baquey et al; "Model Study of the Crosslinking of Polydimethylsiloxanes By Peroxides"; Polymer 2005, 46, pp. 6283-6292.

Chevalliot et al; "Insulating Material Requirements for Low-Power-Consumption Electrowetting-Based Liquid Lenses"; Langmuir 2016, 32, pp. 13585-13592.

Chong et al., "Polydimethylsiloxane-(PDMS-) Grafted flurorcoplymers by a Grafting through" strategy based on Atom transfer radical (Co) polymerization, Macromolecules, vol. 40, No. 20, 2007, pp. 7195-7207.

Dhindsa et al; "Electrowetting Without Electrolysis on Self-Healing Dielectrics"; Langmuir 2011, 27, pp. 5665-5670.

International Search Report and Written Opinion of the International Searching Authority; PCT/US2022/036757; dated Dec. 12, 2022; 21 pages; European Patent Office.

Mugele et al., "Electrowetting : fundamental principles and practical application", Wiley-VCH (2018), 6 pages.

* cited by examiner

MODIFIED POLYMER WITH A SLIPPERY OMNIPHOBIC COVALENTLY ATTACHED LIQUID CHEMICALLY BONDED THERETO, METHOD OF MAKING THE SAME, LIQUID LENS INCORPORATING THE MODIFIED POLYMER AS AN INSULATING LAYER, AND LIQUID LENS WITH INSULATING LAYER HAVING HIGH QUALITY FACTOR USABLE UNDER DIRECT CURRENT

This Application claims the benefit of priority to U.S. Provisional Patent Application Ser. No. 63/224,197 filed on Jul. 21, 2021, the content of which is relied upon and incorporated herein by reference in its entirety.

BACKGROUND

A variable focus lens provides an increased working range compared to a fixed focus lens. With a fixed focus lens, the focal length cannot be changed. However, with a variable focus lens, the focal length of the lens can be changed.

A liquid lens is a type of variable focus lens. A liquid lens generally includes a cavity with a polar or conducting liquid and a non-polar or insulating liquid disposed therein. The liquids are immiscible with each other and have different refractive indices such that the interface between the liquids forms a lens. A common electrode is in electrical communication with the polar or conducting liquid. A driving electrode is near the liquid but separated therefrom by an insulating layer. The insulating layer has dielectric properties. The polar or conducting liquid contacts the insulating layer at a contact angle. The application of a voltage between the driving electrode and the common electrode can cause the contact angle to vary, because the insulating layer builds up a capacitive charge that changes the interaction between the polar or conducting liquid and the insulating layer, and thus changes the contact angle. Thus, changing the voltage can change the contact angle, which changes the shape of the interface. Changing the shape of the interface changes the focal length of the lens.

A selection of polymeric materials have been employed as the insulating layer and have demonstrated beneficial dielectric properties. However, some of those polymeric materials lack adequate hydrophobicity—the cohesive interactions between the polar or conducting liquid and the insulating layer are too strong for changes in voltage to change the contact angle. In addition, the contact angle of the non-polar liquid on the polymeric materials in the presence of a polar liquid is too high (e.g., greater than 20°), which renders hysteresis of the liquid lens incorporating the polymeric material as the insulating layer too high to be reliable. For example, dodecane as the non-polar liquid in the presence of a polar liquid solution of 0.1% w/w potassium acetate in ethylene glycol forms a contact angle of 60° on parylene C (a polymeric material). That contact angle results in a very high electrowetting hysteresis.

To compensate for the lack of adequate hydrophobicity and contact angle, a separate hydrophobic coating can be added to the insulating layer. The separate hydrophobic coating is usually a thin layer of another polymeric material. This strategy is particularly advantageous because the polymeric material forming the insulating layer can be chosen for its dielectric performance and the polymeric material forming the hydrophobic coating can be chosen for its hydrophobic properties. The hydrophobic coating can be applied through wet or gas phase deposition processes (e.g., spin coating, dip coating, CVD, PECVD, and iCVD).

However, the strategy of adding the hydrophobic coating onto the insulating layer causes various problems including (i) poor adhesion of the hydrophobic coating, (ii) a lack of uniformity in coverage and thickness of the hydrophobic coating, (iii) increased voltage required to operate the liquid lens due to increased thickness of the insulating layer with the hydrophobic coating, (iv) increased manufacturing time and cost, and (v) increased failure modes due to complexity of the design. For example, liquid lenses incorporating an insulating layer of parylene C with a hydrophobic coating of fluorinated polymer (e.g., Teflon® AF, Cytop®, and FluoroPel) have shown to have poor reliability after storage at elevated temperatures. These problems are amplified and become critical when the surface used for electrowetting is not flat, such as may be the case for a liquid lens.

In addition, in some circumstances it is desirable to decrease electrical power that a liquid lens consumes while maintaining the performance of the liquid lens. Alternating current typically powers liquid lenses. To decrease electrical power consumption, low frequency alternating current (e.g., less than 1 kHz) or direct current (instead of alternating current) can be utilized to power the liquid lens. However, there is a problem in that typically used insulating layers cause the liquid lens to perform less than optimally when powered with low frequency alternating current or direct current.

SUMMARY

The present disclosure addresses the first problem by grafting a slippery omniphobic covalently attached liquid ("SOCAL") onto the polymeric material of the insulating layer. The SOCAL is thus the operative surface of the insulating layer, and renders the insulating layer highly hydrophobic. However, because the SOCAL is grafted, the potential lack of adhesion inherent in hydrophobic coatings (a mechanical rather than chemical bond) is not a concern. Further, the grafting of the SOCAL does not measurably increase the thickness of the insulating layer, avoiding (i) the lack of uniformity in coverage and thickness and (ii) the increased voltage requirements associated with hydrophobic coatings. Finally, the grafting of the SOCAL onto the polymeric material of the insulating layer is less complex and less intensive in terms of labor and time that the aforementioned hydrophobic coatings.

The present disclosure addresses the second problem with a liquid lens that utilizes an insulating layer with a relatively low dielectric dissipation factor (i.e., high quality factor). When such insulating layers are utilized, the liquid lens can be powered with direct current without causing performance issues. Because direct current can be utilized while maintaining performance, liquid lenses can now be utilized for applications where low electrical power consumption is required or beneficial. The insulating layer, when a polymeric material again can be modified with by grafting a slippery omniphobic covalently attached liquid thereupon.

According to a first aspect of the present disclosure, a liquid lens comprises: (i) a first liquid and a second liquid disposed within a containment region, the first liquid and the second liquid forming an interface between the first liquid and the second liquid; (ii) an electrode; and (iii) an insulating layer separating the electrode from the first liquid and the second liquid, the insulating layer comprising a polymeric material and a slippery omniphobic covalently attached liquid that is chemically bonded to the polymeric material, the slippery omniphobic covalently attached liquid providing a surface contacting one or more of the first liquid and the second liquid.

According to a second aspect of the present disclosure, the liquid lens of the first aspect, wherein the polymeric material of the insulating layer comprises a poly(para-xylylene).

According to a third aspect of the present disclosure, the liquid lens of the first aspect, wherein the polymeric material of the insulating layer comprises repeating units of the following formula

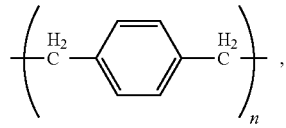

and n is an integer.

According to a fourth aspect of the present disclosure, the liquid lens of the first aspect, wherein the polymeric material of the insulating layer comprises repeating units of the following formula

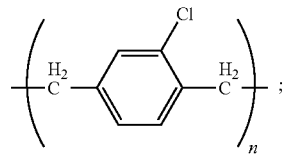

and n is an integer.

According to a fifth aspect of the present disclosure, the liquid lens of the first aspect, wherein the polymeric material of the insulating layer comprises repeating units of the following formula

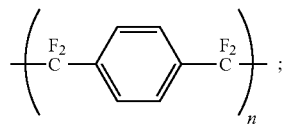

and n is an integer.

According to a sixth aspect of the present disclosure, the liquid lens of any one of the first through fifth aspects, the slippery omniphobic covalently attached liquid comprises silicone chains bound to repeating units of the polymeric material.

According to a seventh aspect of the present disclosure, the liquid lens of any one of the first through fifth aspects, wherein the slippery omniphobic covalently attached liquid comprises polyolefin or long alkyl chains bound to repeating units of the polymeric material.

According to an eighth aspect of the present disclosure, the liquid lens of the first aspect, wherein the insulating layer comprises repeating units represented by one or more of the following formulas:

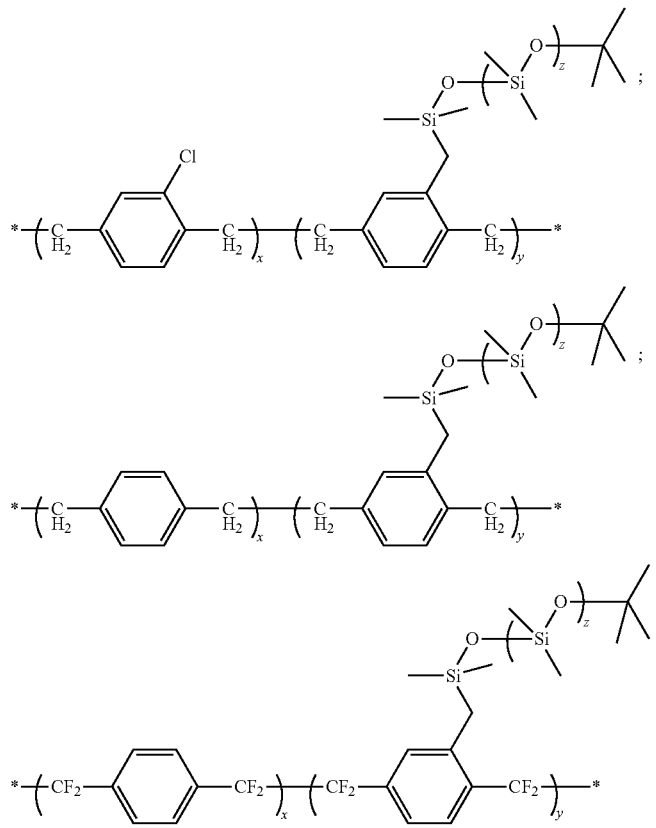

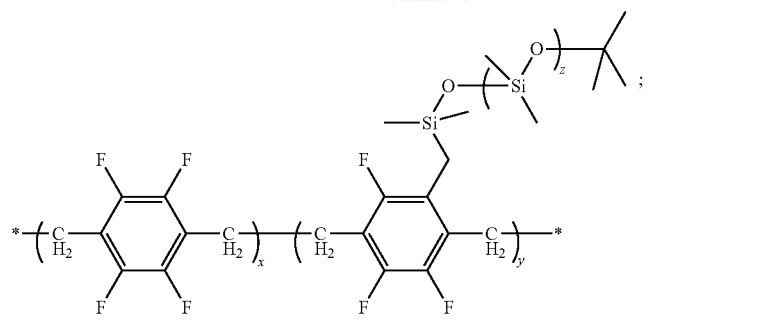
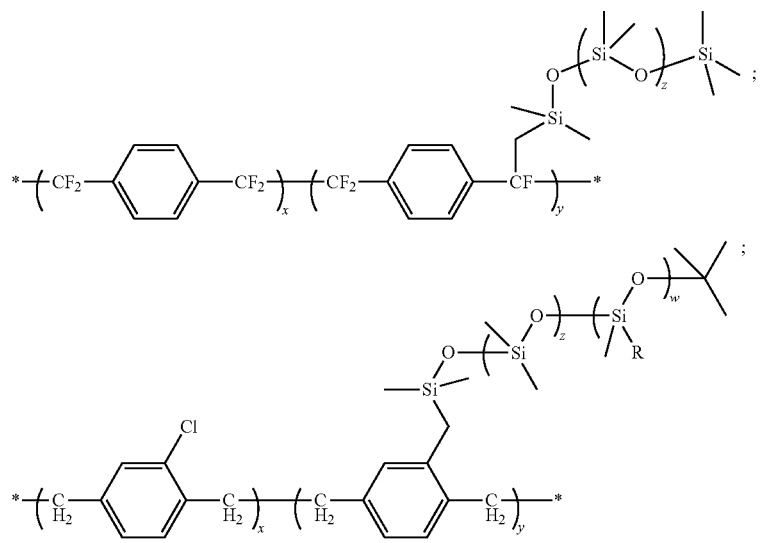
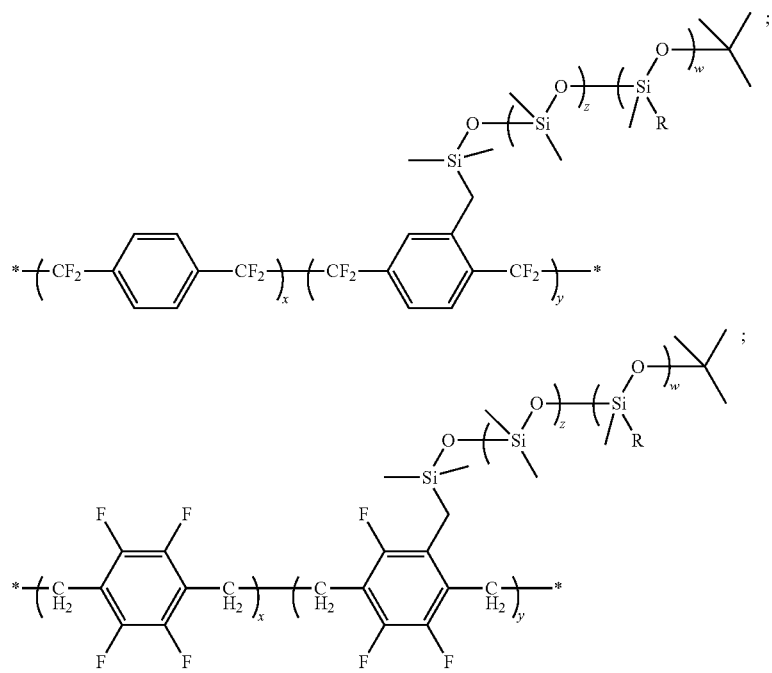

-continued
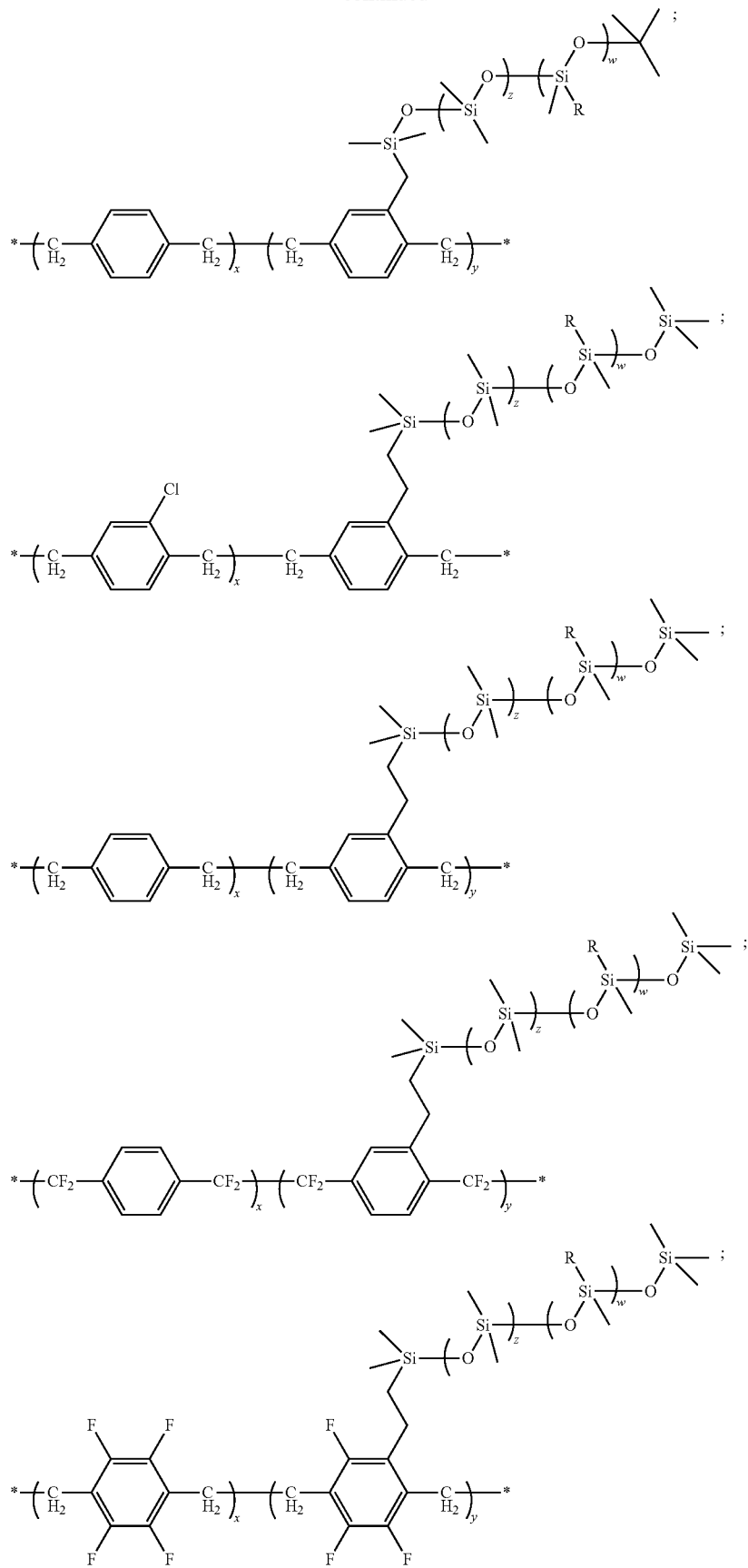

-continued

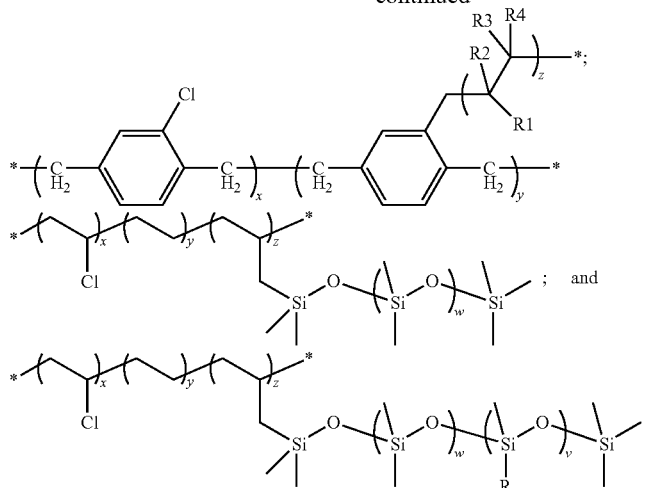

v, w, x, y, z are integers greater than 1; and R, R1, R2, R3, R4 comprises any one of (i) an hydrogen, (ii) an alkyl chain, (iii) a fluorinated alkyl moiety.

According to a ninth aspect of the present disclosure, the liquid lens of the first aspect, wherein (i) the polymeric material of the insulating layer comprises a poly(para-xylylene); and (ii) the insulating layer is a product of contacting the polymer material with a solution comprising a silicone, a halogenated polyolefin, or a halogenated long alkyl chain resulting in a change in chemical composition of the insulating layer at the surface.

According to a tenth aspect of the present disclosure, the liquid lens of any one of the first through ninth aspects, wherein the slippery omniphobic covalently attached liquid that is chemically bonded to the polymeric coating comprises a thickness, and the thickness is less than or equal to 25 nm.

According to an eleventh aspect of the present disclosure, the liquid lens of any one of the first through tenth aspects, wherein (i) the first liquid is an insulating or non-polar liquid; (ii) the second liquid is a conductive or polar liquid; and (iii) the first liquid in the presence of the second liquid forms a contact angle of 20° or less on the surface of the insulating layer.

According to a twelfth aspect of the present disclosure, the liquid lens of any one of the first through eleventh aspects, wherein (a) the liquid lens is actuated under (i) direct current or (ii) alternating current having a frequency of less than or equal to 0.1 Hz; and (b) the insulating layer or the liquid lens displays a quality factor, measured under alternating current having a frequency of 1 kHz, of at least 200.

According to a thirteenth aspect of the present disclosure, a liquid lens comprises: (i) a first liquid and a second liquid disposed within a containment region, the first liquid and the second liquid forming an interface between the first liquid and the second liquid; (ii) an electrode; and (iii) an insulating layer separating the electrode from the first liquid and the second liquid, the insulating layer or the liquid lens displaying a quality factor, measured under alternating current having a frequency of 1 kHz, of at least 200; wherein, the liquid lens is actuated under (i) direct current or (ii) alternating current having a frequency of less than or equal to 0.1 Hz.

According to a fourteenth aspect of the present disclosure, the liquid lens of the thirteenth aspect, wherein the insulating layer further comprises a polymeric material, and the polymeric material comprises the polymeric material of the insulating layer comprises a poly(para-xylylene).

According to a fifteenth aspect of the present disclosure, the liquid lens of the fourteenth aspect, wherein the poly(para-xylylene) has repeating units of one or more of the following formulas

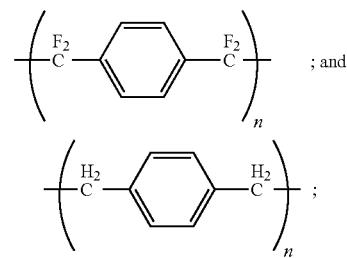

and
n is an integer.

According to a sixteenth aspect of the present disclosure, the liquid lens of the fourteenth aspect, wherein the insulating layer further comprises a slippery omniphobic covalently attached liquid that is chemically bonded to the polymeric material, the slippery omniphobic covalently attached liquid providing a surface contacting one or more of the first liquid and the second liquid.

According to a seventeenth aspect of the present disclosure, the liquid lens of the fifteenth aspect, wherein the insulating layer further comprises a slippery omniphobic covalently attached liquid that is chemically bonded to the polymeric material, the slippery omniphobic covalently attached liquid providing a surface contacting one or more of the first liquid and the second liquid.

According to a eighteenth aspect of the present disclosure, the liquid lens of any one of the sixteenth through seventeenth aspects, wherein the slippery omniphobic covalently attached liquid comprises silicone chains, polyolefin chains, or long alkyl chains bound to repeating units of the polymeric material.

According to a nineteenth aspect of the present disclosure, the liquid lens of any one of the sixteenth through eighteenth aspects, wherein the slippery omniphobic covalently attached liquid that is chemically bonded to the polymeric coating comprises a thickness, and the thickness is less than or equal to 25 nm.

According to a twentieth aspect of the present disclosure, the liquid lens of any one of the thirteenth through nineteenth aspects, wherein (i) the first liquid is an insulating or non-polar liquid; and (ii) the first liquid forms a contact angle of 20° or less on the surface of the insulating layer.

According to a twenty-first aspect of the present disclosure, the liquid lens of any one of the fourteenth through seventeenth aspects, wherein the insulating layer is a product of contacting the polymer material with a solution comprising a silicone, a halogenated polyolefin, or a halogenated long alkyl chain resulting in a change in chemical composition of the insulating layer at the surface.

According to a twenty-second aspect of the present disclosure, a modified polymer comprises: a polymeric material and a slippery omniphobic covalently attached liquid that is chemically bonded to the polymeric material.

According to a twenty-third aspect of the present disclosure, the modified polymer of the twenty-second aspect, wherein the polymeric material of the insulating layer comprises a poly(para-xylylene).

According to a twenty-fourth aspect of the present disclosure, the modified polymer of any one of the twenty-second through twenty-third aspects, wherein the slippery omniphobic covalently attached liquid that is chemically bonded to the polymeric coating comprises a thickness, and the thickness is less than or equal to 25 nm.

According to a twenty-fifth aspect of the present disclosure, the modified polymer of any one of the twenty-second through twenty-fourth aspects, wherein the slippery omniphobic covalently attached liquid comprises a surface energy that is less than or equal to 25 mN/m, and a polar part of the surface energy is less than or equal to 1 mN/m.

According to a twenty-sixth aspect of the present disclosure, the modified polymer of any one of the twenty-second through twenty-fifth aspects, wherein (i) the slippery omniphobic covalently attached liquid provides a surface; and (ii) dodecane on the surface in the presence of a 0.1 w/w potassium acetate in ethylene glycol forms a contact angle relative to the surface of less than or equal to 20°.

According to a twenty-seventh aspect of the present disclosure, the modified polymer of the twenty-second aspect, wherein the modified polymer comprises repeating units represented by one or more of the following formulas:

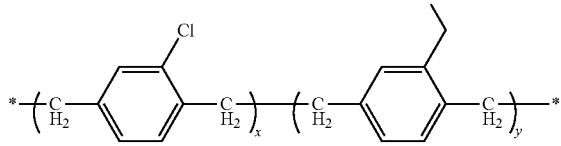

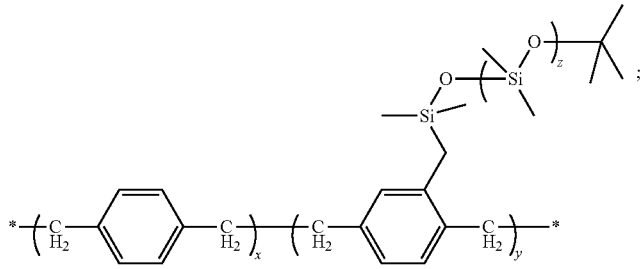

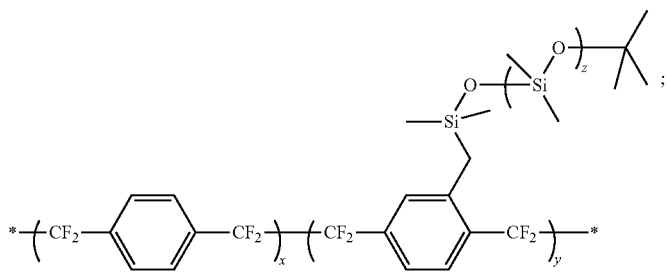

-continued
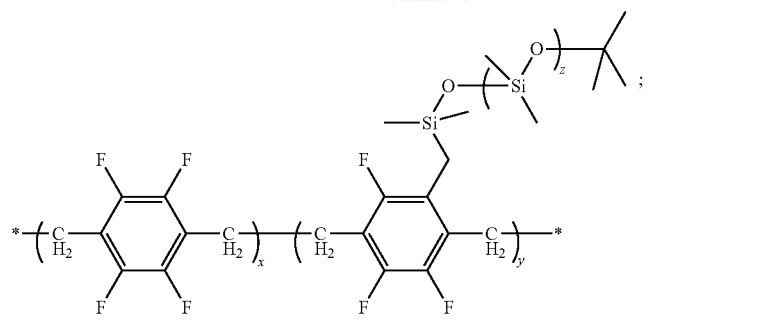
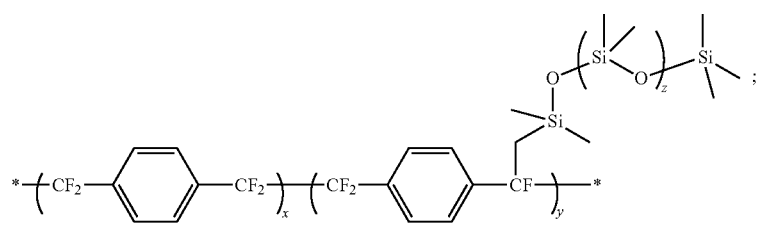
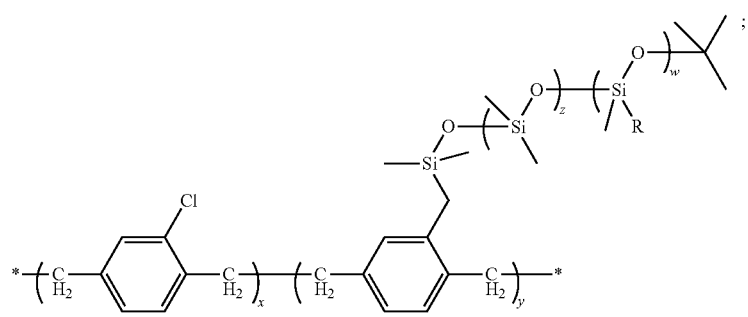
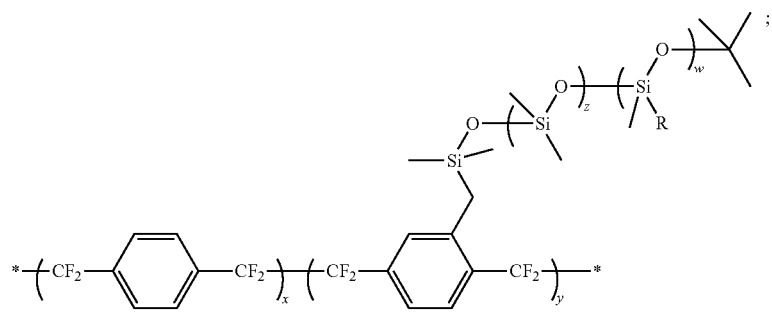
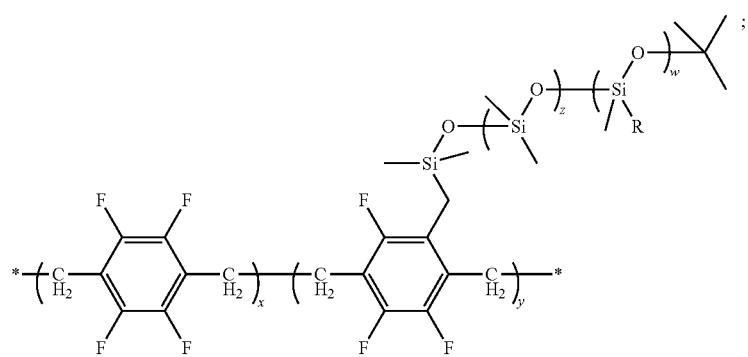

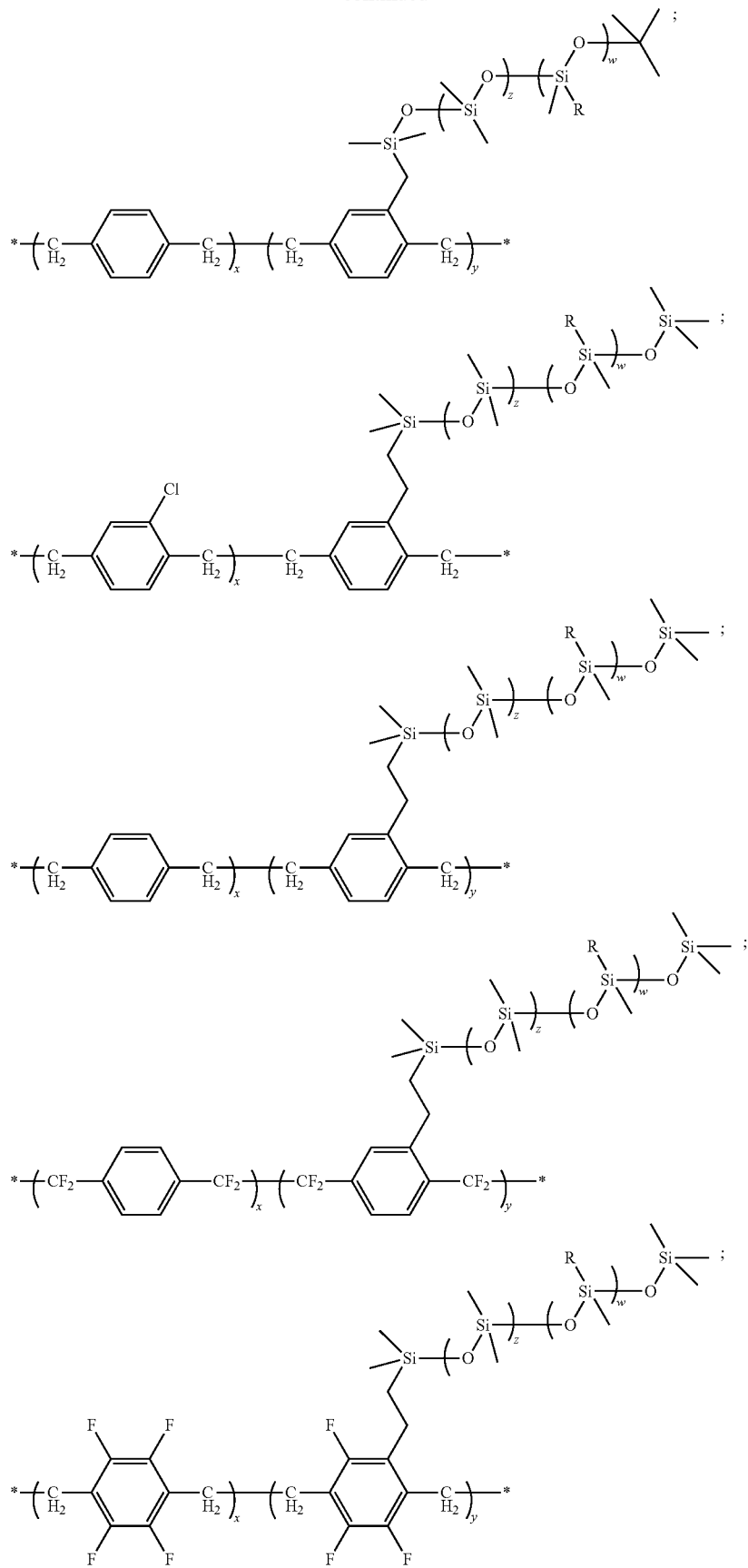

-continued

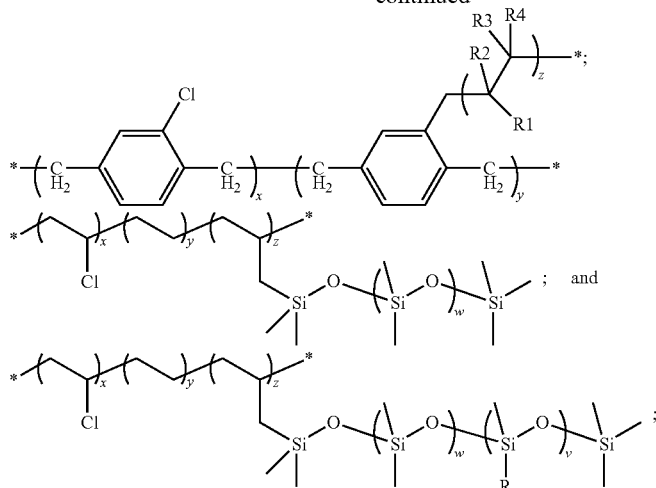

v, w, x, y, z are integers greater than 1; and
R, R1, R2, R3, R4 comprises any one of (i) an hydrogen, (ii) an alkyl chain, (iii) a fluorinated alkyl moiety.

According to a twenty-eighth aspect of the present disclosure, a method of modifying a poly(para-xylylene) comprises: contacting a surface of a poly(para-xylylene) with a solution comprising a silicone, a halogenated polyolefin, or a halogenated long alkyl chain; wherein, chains of the silicone, the halogenated polyefin, or the halogenated long alkyl, whichever the solution comprises, chemically bond to repeating units of the poly(para-xylylene).

According to a twenty-ninth aspect of the present disclosure, the method of the twenty-eighth aspect, wherein the solution comprises the silicone, and the silicone is a polydimethylsiloxane homopolymer or copolymer.

According to a thirtieth aspect of the present disclosure, the method of the twenty-eighth aspect, wherein the silicone comprises the silicone, and the silicone is a copolymer of dimethysiloxane and methylfluoroalkylsiloxane.

According to a thirty-first aspect of the present disclosure, the method of the thirtieth aspect, wherein the methylfluoroalkylsiloxane is tridecafluorooctylmethylsiloxane.

According to a thirty-second aspect of the present disclosure, the method of the twenty-eighth aspect, wherein the solution comprises the silicone, and the silicone is a vinyl-terminated polydimethylsiloxane homopolymer or copolymer.

According to a thirty-third aspect of the present disclosure, the method of the twenty-eighth aspect, wherein the solution comprises the silicone, and the silicone is a chloromethyl terminated polydimethylsiloxane homopolymer or copolymer.

According to a thirty-fourth aspect of the present disclosure, the method of the twenty-eighth aspect, wherein the solution comprises the silicone, and the silicone is a trimethylsiloxy terminated polydimethylsiloxane homopolymer or copolymer.

According to a thirty-fifth aspect of the present disclosure, the method of the twenty-eighth aspect, wherein solution comprises the silicone, and the silicone is a methylhydrosiloxane/dimethylsiloxane copolymer.

According to a thirty-sixth aspect of the present disclosure, the method of the twenty-eighth aspect, wherein the solution comprises the halogenated polyolefin, and the halogenated polyolefin is a chlorinated polyethylene.

According to a thirty-seventh aspect of the present disclosure, the method of the twenty-eighth aspect, wherein the poly(para-xylylene) comprises repeating units of one or more of the following formulas

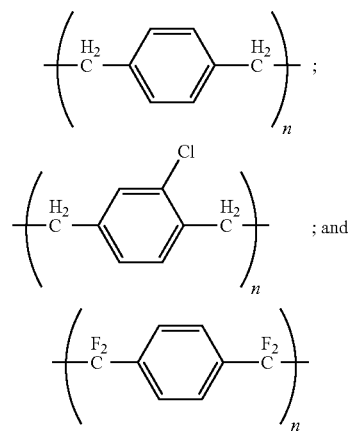

and n is an integer.

According to a thirty-eighth aspect of the present disclosure, the method of any one of the twenty-eighth through thirty-seventh aspects, wherein the solution further comprises a Karstedt's catalyst.

According to a thirty-ninth aspect of the present disclosure, the method of any one of the twenty-eighth through thirty-seventh aspects, wherein the solution further comprises a palladium complex catalyst.

According to a fortieth aspect of the present disclosure, the method of any one of the twenty-eighth through thirty-seventh aspects, wherein the solution further comprises aluminum chloride.

According to a forty-first aspect of the present disclosure, the method of any one of the twenty-eighth through thirty-seventh aspects, wherein the solution further comprises a peroxide.

According to a forty-second aspect of the present disclosure, the method of any one of the twenty-eighth through forty-first aspects further comprises subjecting the solution-contacted poly(para-xylylene) to an environment comprising a temperature above room temperature.

According to a forty-third aspect of the present disclosure, the method of any one of the twenty-eighth through forty-second aspects, wherein (i) before contacting the poly(para-xylylene) with the solution, a non-polar liquid contacting the surface of the poly(para-xylylene) in the presence of a polar liquid forms a first contact angle that is greater than or equal to 50°; and (ii) after contacting the poly(para-xylylene) with the solution, the non-polar liquid contacting the surface in the presence of the polar solution forms a second contact angle that is less than or equal to 30 degrees.

According to a forty-fourth aspect of the present disclosure, the method of any one of the twenty-eighth through forty-third aspects, wherein the poly(para-xylylene) is disposed on an electrode within a containment region; and the method further comprises (i) depositing a first liquid and a second liquid within the containment region and (ii) closing the containment region, trapping the first liquid and the second liquid within the containment region, and an interface forms between the first liquid and the second liquid.

DETAILED DESCRIPTION

—Liquid Lens 10—

Figure 1:
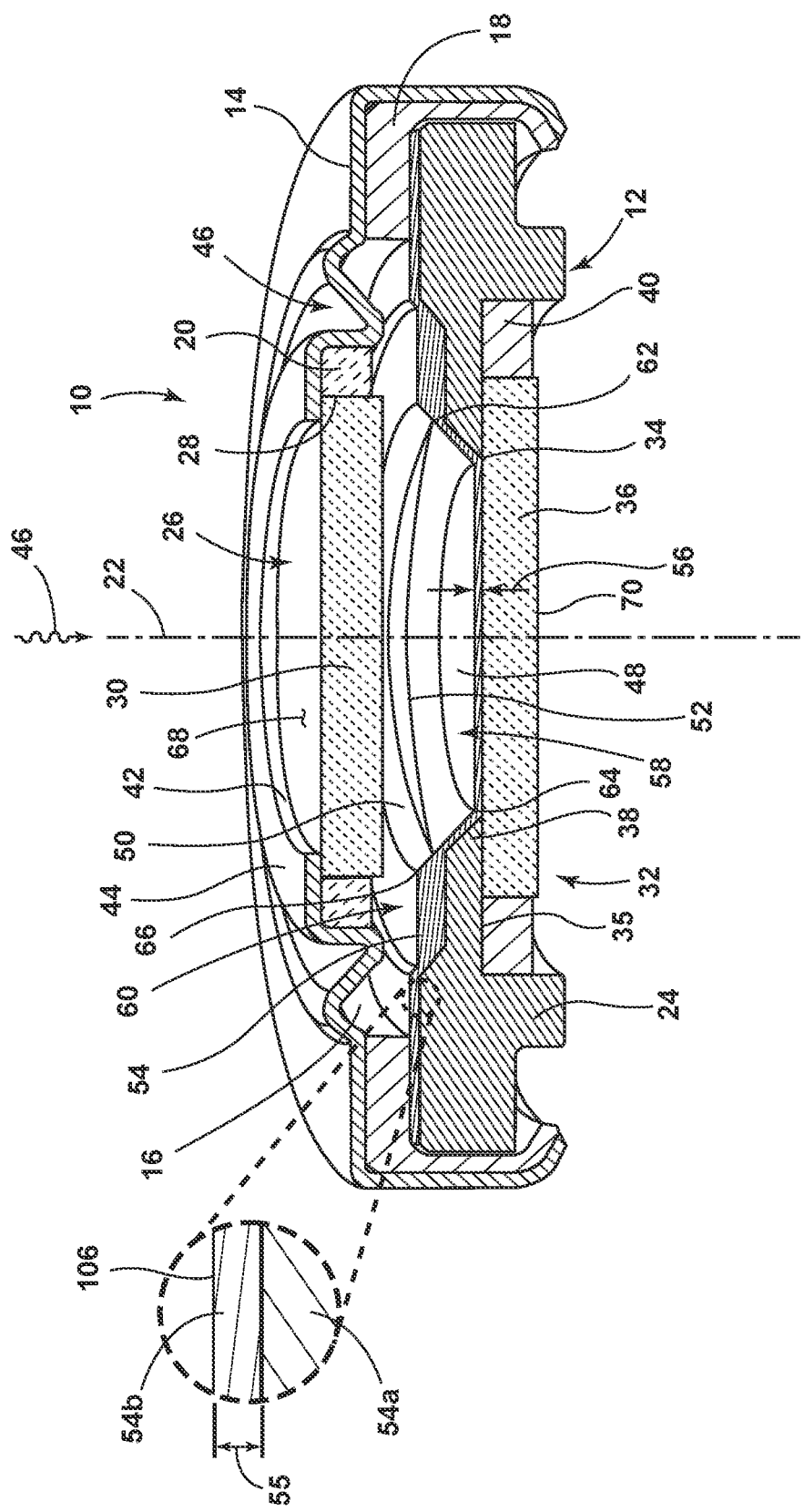
FIG. 1 is a perspective view of a cross-section of a liquid lens of the present disclosure, illustrating an insulating layer separating an electrode from a first liquid and a second liquid, and an interface between the first liquid and the second liquid disposed on the insulating layer.
Figure 1A:
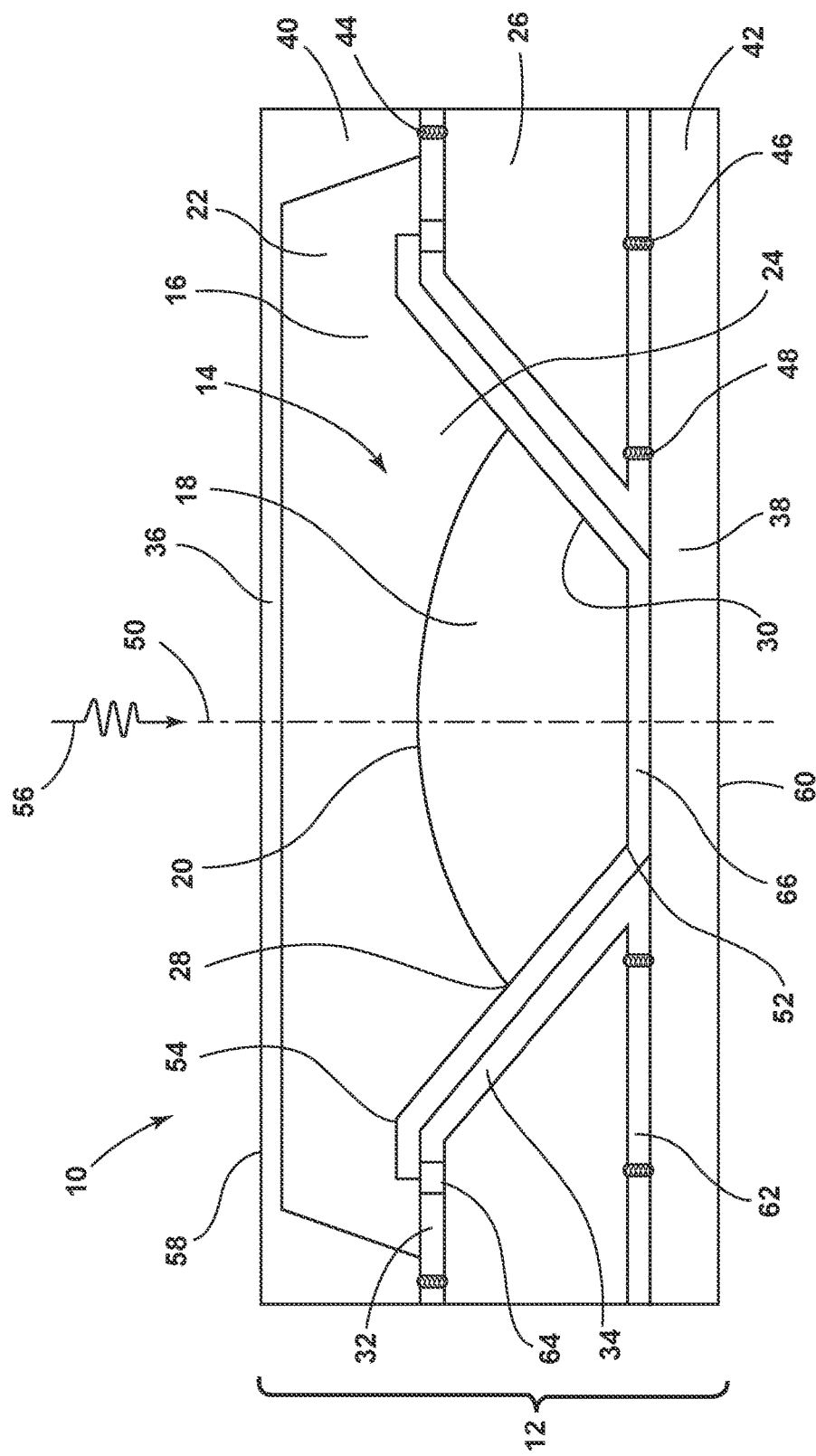
FIG. 1A-1B is a perspective view of a cross-section of a liquid lens of the present disclosure.
Figure 1B:
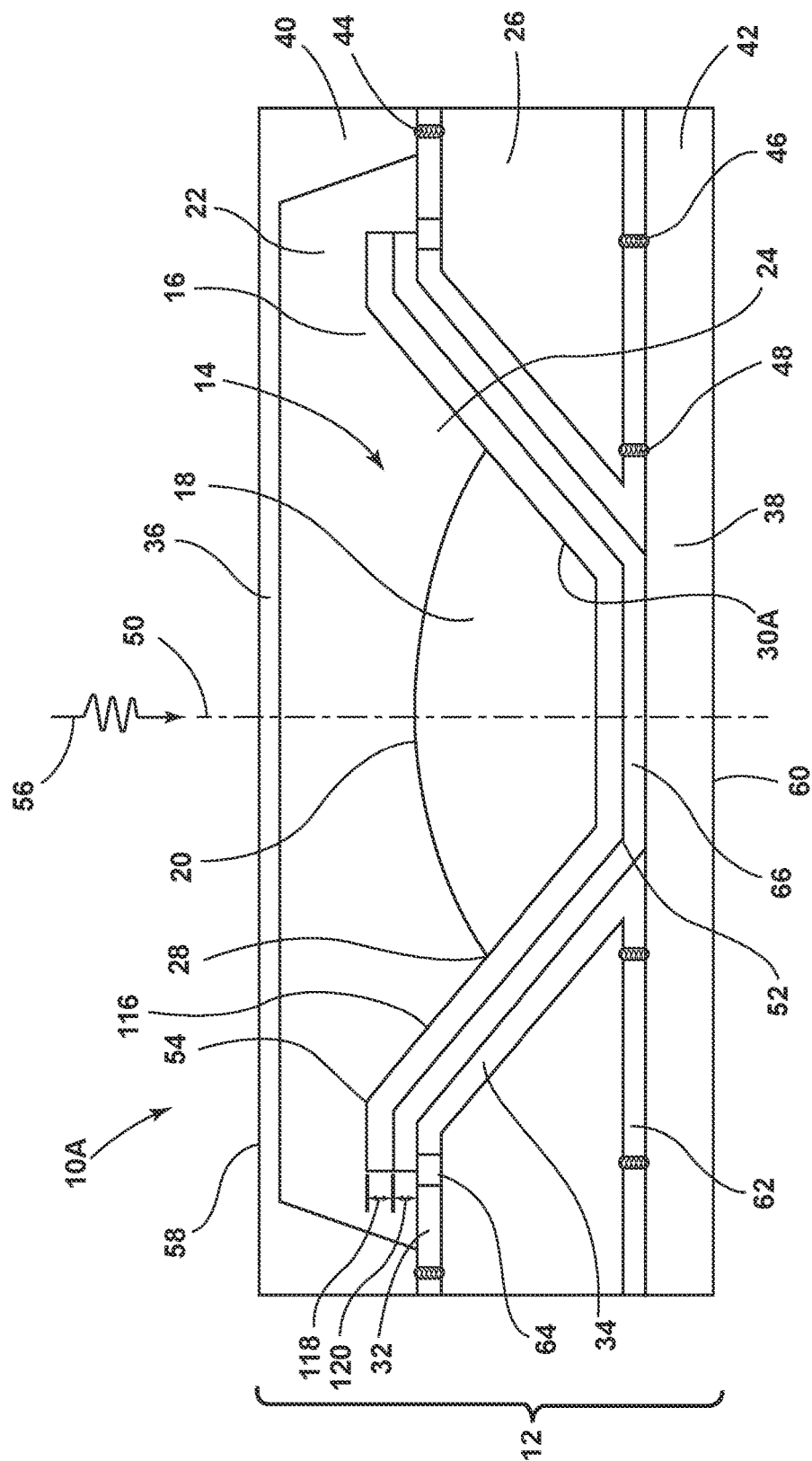

Referring now to FIG. 1, in embodiments, a liquid lens 10 includes a base 12 and a cap 14. The base 12 and the cap 14 can be mounted relative to one another to facilitate maintenance of a fluid-tight containment region 16 to provide electrical insulation between the base 12 and the cap 14. A gasket 18 may be disposed between the base 12 and the cap 14 to facilitate maintenance of the fluid-tight containment region 16.

The liquid lens 10 includes a first electrode 20, an optical axis 22, and a second electrode 24. In embodiments, the liquid lens 10 is rotationally symmetric about the optical axis 22. The first electrode 20 and/or the second electrode 24 may comprise a conductor. In embodiments, the first electrode 20 and/or the second electrode 24 includes a metal, such as one or more of copper, silver, gold, platinum, aluminum, chromium, titanium, nickel, steel, bronze, and/or brass. In embodiments, the first electrode 20 and/or the second electrode 24 includes an conductive polymer, such as one or more of poly(3,4-ethylenedioxythiophene) (PEDOT), polyphenylsulfide (PSS), PEDOT:PSS, poly-p-phenylene (PpP), polythiophene (PTh), polyanilines (PANI), polypyrrole (PPy), polythalocyanine (PPhc), or polyisothianaphtalene (PITN). In embodiments, the first electrode 20 and/or the second electrode 24 includes a material that is transparent over desired operating wavelength range of the liquid lens 10. In embodiments, the second electrode 24 includes one or more of PEDOT, PEDOT:PSS, aluminum oxide, cadmium oxide, gallium oxide, tin oxide (e.g., indium tin oxide (ITO)), and zinc oxide. In embodiments, the first electrode 20 and/or second electrode 24 are doped with one or more transition metals and/or Group IIIA metals (e.g., aluminum, gallium indium, thallium). In embodiments, the first electrode 20 and/or the second electrode 24 include an intrinsically conductive polymer (e.g., the bulk of the polymer is conductive). In embodiments, the first electrode 20 and/or the second electrode 24 includes a polymer composite with nanoparticles and/or carbon fiber.

In embodiments, the first electrode 20 circumscribes a first window 26 via a through aperture 28. In embodiments, the first window 26 further includes a first substrate 30. In embodiments, the first substrate 30 is mounted relative to the through aperture 28. In embodiments, the first substrate 30 is mounted entirely within the through aperture 28 of the first electrode 20, with the first electrode 20 entirely circumscribing the first substrate 30.

In embodiments, the second electrode 24 at least partially circumscribes a second window 32 via a through aperture 34 of the second electrode 24. In embodiments, the through aperture 34 of the second electrode 24 has a cross-sectional diameter in a direction perpendicular to the optical axis 22 that is stepped to define a seat 35. In embodiments, the second window 32 further includes a second substrate 36. In embodiments, the second substrate 36 is mounted relative to the corresponding through aperture 34. In embodiments, a portion 38 of the second electrode 24 extends over an outer circumferential portion of one or both major surfaces of the second substrate 36.

In embodiments, the second substrate 36 is mounted by a fitting 40 to the seat 35 of the through aperture 34. Furthermore, in embodiments, the base 12 includes the second electrode 24, the second window 32, and the fitting 40. In such embodiments, the gasket 18 provides a fluid seal between the second electrode 24 of the base 12 and the cap 14 to facilitate maintenance of the fluid-tight containment region 16.

In embodiments, the cap 14 includes or supports the first electrode 20 and the first window 26. In embodiments, the cap 14 defines an effective through aperture 42 that is smaller than a diameter of through aperture 28 of the first electrode 20, wherein a lip 44 extends over the outer surface of the first electrode 20 and over an outer peripheral portion of the first window 26 to protect the first electrode 20 and the interface between the first substrate 30 and the first electrode 20 from external forces and environmental conditions. Furthermore, the lip 44 extends over an outer peripheral surface of the first electrode 20 to further help protect the first electrode 20 from external forces and environmental conditions as well as help seat the first electrode 20 within a reception area of the cap 14. In embodiments, the cap 14 has a shape that is rotationally symmetric about the optical axis 22. In embodiments, as shown, the cap 14 has a substantially "S" shaped portion 46 that can has bent portions with one bent portion having an opening facing the fluid-tight containment region 16 and another bent portion having an opening facing away from the fluid-tight containment region 16. The substantially "S" shaped portion 46 may allow some movement of the first substrate 30a along the optical axis 22 when pressure is exerted by the fluids (not shown for clarity) inside the fluid-tight containment region 16 of the liquid lens 10 and/or when pressure is externally exerted on the cap 14 of the liquid lens 10.

The optical axis 22 intersects both the first window 26 and the second window 32. In embodiments, as shown, the optical axis 22 passes through the center of volume of both the first substrate 30 and the second substrate 36. In embodiments, second window 32 is aligned with the first window 26 along the optical axis 22.

In embodiments, transmittance of incident electromagnetic radiation 46 of the desired wavelength range through the first window 26 and the second window 32 into the fluid-tight containment region 16 or out of the fluid-tight containment region 16 is about 85% or more. In embodiments, the first substrate 30 and the second substrate 36 each have an average transmission over an operating wavelength range of the incident electromagnetic radiation 46 of about 85% or greater, about 88% or greater, about 90% or greater, about 92% or greater, about 94% or greater, about 96% or greater, about 98% or greater, or about 99% or greater. As used herein, transmittance refers to an arithmetic average (e.g., mean) percentage of incident intensity of the electromagnetic radiation 46 transmitted through a material or a device over the operating wavelength range. In embodiments, the operating wavelength range may be over visible optical wavelengths. In embodiments, the operating wavelength range may be over a range of wavelengths from about 400 nanometers (nm) to 700 nm, from about 400 nm to about 550 nm, from about 550 nm to about 700 nm, from about 600 nm to about 700 nm, or any range or subrange therebetween. In some embodiments, the operating wavelength range may be over infrared wavelengths, such as over a range of wavelengths from about 700 nm to about 1,000 micrometers (μm). In embodiments, the operating wavelength range may be over a range of ultraviolet wavelengths, such as over a range of wavelengths from about 10 nm to about 400 nm.

The first substrate 30 and/or the second substrate 36 can comprise a polymer, a crystalline material (e.g., quartz, sapphire, single crystal or polycrystalline alumina, spinel ($MgAl_2O_4$)), a glass-based material, or combinations thereof. Examples of suitable polymers comprise, without limitation, the following including copolymers and blends thereof: thermoplastics including polystyrene (PS), polycarbonate (PC), polyesters including polyethyleneterephthalate (PET), polyolefins including polyethylene (PE), acrylic polymers including polymethyl methacrylate (PMMA), epoxies, and silicones including polydimethylsiloxane (PDMS). As used herein, "glass-based" includes both glasses and glass-ceramics, wherein glass-ceramics have one or more crystalline phases and an amorphous, residual glass phase. A glass-based material may comprise an amorphous material (e.g., glass) and optionally one or more crystalline materials (e.g., ceramic). Exemplary glass-based materials, which may be free of lithia or not, include soda lime glass, alkali aluminosilicate glass, alkali containing borosilicate glass, alkali aluminophosphosilicate glass, and alkali aluminoborosilicate glass.

The liquid lens 10 further includes a first liquid 48 and a second liquid 50 disposed within the fluid-tight containment region 16. An interface 52 is formed between the first liquid 48 and the second liquid 50. For example, in embodiments, the first liquid 48 and the second liquid 50 are immiscible. In embodiments, although not shown, the interface 52 can be a transparent membrane that separates the first liquid 48 from the second liquid 50. The interface 52 forms a lens. In embodiments, the first liquid 48 and the second liquid 50 have substantially the same density, which can help to avoid changes in the shape of the interface 52 as a result of changing the physical orientation of liquid lens 10 (e.g., as a result of gravitational forces). In embodiments, the first liquid 48 has a refractive index that is greater than a refractive index of a second liquid 50. In embodiments, the first liquid 48 has a refractive index that is less than a refractive index of a second liquid 50. The optical axis 22 passes through the interface 52.

In embodiments, the first liquid 48 is a non-conductive liquid. In embodiments, the first liquid 48 is a non-polar liquid. Examples of the first liquid 48 include inorganic liquids (e.g., silicone oil), alkyl chain molecules (e.g., hexane, heptane, octane, nonane, decane, dodecane), aromatic compounds (e.g., benzene, toluene, diphenyldimethylsilane, 2-(ethylthio)benzothiazole, 1-choloronaphtalene, thianaphtene, 4-bromodiphenyl ether, 1-phenylnaphtalene, 2,5-dibromotoluene, phenyl sulphide), fluorinated hydrocarbons, fluorinated silicones, germanium organometallic compounds (eg, tetramethylgermane, tetraethylgermane, hexamethyldigermane, hexaethyldigermane, diphenyldimethylgermane, phenyltrimethylgermane), or combinations thereof.

In embodiments, the second liquid 50 is a conductive liquid. In embodiments, the second liquid 50 is a polar liquid. Examples of the second liquid 50 includes alcohols (e.g., methanol, propanediols), glycols (e.g., ethylene glycol, propylene glycol, trimethylene glycol), ionic liquids (e.g., lithium carbonate, 1-ethyl-3-methylimidazolium-based, 1-alkylpyridinium-based, 1-butyl-3-methylimidazolium tetrafluoroborate-based, N-methyl-N-alkylpyrrolidinium-based liquids), inorganic ionic solutions (e.g., sodium phosphate, sodium bromide, sodium chloride, calcium chloride, lithium chloride, ammonium carbonate, ammonium tetrafluoroboratepotassium nitrate), organic ionic solutions (e.g., potassium acetate, acetic acid, succinic acid, iminodiacetic acid (IDA), nitrilotriacetic acid (NTA), ethylenediaminetetraacetic acid (EDTA), diethylene triamine pentaaectic acid (DTPA), ethylene glycol tetraacetic acid (EGTA), 1,2-bis(o-aminophenoxy)ethane-N,N,N'N'-tetraacetic acid (BAPTA), 2,2'2"-(1,4,7-triazonane-1,4,7-triyl) triacetic acid (NOTA), 1,4,7,10-tetranzacyclododecane-1,4, 7,10-tetraacetic acid (DOTA)), and combinations thereof (e.g., 0.1 w/w potassium acetate in ethylene glycol).

The liquid lens 10 further includes an insulating layer 54. The insulating layer 54 covers the second window 32, the through aperture 34, and the second electrode 24 from the point of view of the containment region 16. The insulating layer 54 covers the portion of the second substrate 36 that the second electrode 24 does not cover. The insulating layer 54 has a thickness 56. In embodiments, the thickness of the insulating layer 54 varies as a function of distance from the optical axis 22. The first electrode 20 is in electrical communication with the second liquid 50. The insulating layer 54 insulates the first liquid 48 and the second liquid 50 from the second electrode 24. In embodiments, the insulating layer 54 is sufficiently transparent to enable passage of the electromagnetic radiation 46 desired to be sensed through the second window 32 as described herein. Additional aspects of the insulating layer 54 for purposes of this disclosure will be discussed further below.

In embodiments, the containment region 16 includes a first portion 58 (or base portion) and a second portion 60 (or headspace). In embodiments, at least a portion of the first liquid 48 is disposed in the first portion 58 of the containment region 16, while at least a portion of the second liquid 50 is disposed within the second portion 60 of the containment region 16. In embodiments, substantially all of the first liquid 48 is disposed within the first portion 58 of the containment region 16. In embodiments, a perimeter 62 of the interface 52 (e.g., the edge of the interface 52 in contact with insulating layer 54) is disposed within the first portion 58 of the containment region 16.

In embodiments, the containment region 16 (e.g., the first portion 58 of the containment region 16) is tapered as shown in FIG. 1 such that a cross-sectional area of the containment region 16 decreases along the optical axis 22 in a direction from the first window 26 to the second window 32. For example, the first portion 58 of the containment region 16 comprises a narrow end 64 and a wide end 66. The terms "narrow" and "wide" are relative terms, meaning the narrow end 64 is narrower, or has a smaller width or diameter, than the wide end 66. Such a tapered containment region 16 can help to maintain alignment of the interface 52 between the first liquid 58 and the second liquid 50 along the optical axis 22. In other embodiments, the containment region 16 is tapered such that the cross-sectional area of the containment region 16 increases along the optical axis 22 in the direction from the first window 26 to the second window 32 or non-tapered such that the cross-sectional area of the containment region 16 remains substantially constant along the optical axis 22.

In embodiments, the electromagnetic radiation 46 (e.g., one or more of visible light, ultraviolet light, and infrared radiation) enters the liquid lens 10 through the first window 26, is refracted at the interface 52 between the first liquid 48 and the second liquid 50, and exits the liquid lens 10 through the second window 32. In embodiments, as explained, the first substrate 30 and the second substrate 36 are sufficiently transparent to enable passage of the desired wavelengths of electromagnetic radiation 46. The electromagnetic radiation 46 exiting the second window 38 can be sensed by a sensor (not illustrated).

In some embodiments, either or both of an outer surface 68 of the first substrate 30 and an outer surface 70 of the second substrate 36 are substantially planar. Thus, although the liquid lens 10 can function as a lens (e.g., by refracting the electromagnetic radiation 46 passing through interface 52), the outer surfaces 68, 70 of the liquid lens 10 can be flat as opposed to being curved like outer surfaces of a fixed lens. In other embodiments, either or both of the outer surfaces 68, 70 are curved (e.g., concave or convex).

In embodiments, the liquid lens 10 includes a power source connected to the first electrode 20 and the second electrode 24. In embodiments, although not shown, the first electrode 20 is connected to a ground by a first lead while the second electrode 24 is connected to the power supply by a second lead. In embodiments, although not shown, the first electrode 20 is connected to the power supply by a first lead while the second electrode 24 is connected to a ground by a second lead. As used herein, ground refers to a connection to earth or another large reservoir of charge such as a large conductive body. As used herein, a power source is any device capable of creating an electric potential difference.

Application of an electrical potential difference between the first electrode 20 and the second electrode 24 from the power source can change the shape of the lens formed by the interface 52 between the first liquid 48 and the second liquid 50. Without wishing to be bound by theory, the lens formed by the interface 52 between the first liquid 48 and the second liquid 50 may be adjusted using the electrowetting phenomena by adjusting the applied potential difference between the first electrode 20 and the second electrode 24. In embodiments, adjusting the applied voltage changes the focal length of the lens. For example, such a change of focal length can enable liquid lens 10 to perform an autofocus function. As used herein, the optical power of a lens is measured using diopters, which is a reciprocal of a focal length of a lens. In some embodiments, the optical power may be adjusted by about 0.25 diopters (D) or more, about 1 D or more, about 2 D or more, about 5 D or more, about 40 D or less, about 30 D or less, about 20 D or less or about 10 D or less. In some embodiments, the optical power of the lens may be adjustable in a range from about −20 D to about 20 D, from about −15 D to about 15 D, from about −10 D to about 10 D, from about −5 D to about 5 D, from about −2 D to about 2 D, from about 0 D to about 20 D, from about 0 D to about 10 D, from about 0 D to about 5 D, from about 0 D to about 2 D, or any range or subrange therebetween.

Additionally, or alternatively, application of an electrical potential difference between the first electrode 20 and the second electrode 24 from the power source tilts the interface 52 relative to an optical axis 22 of the liquid lens 10. Such tilting can enable the liquid lens 10 to perform an optical image stabilization ("OIS") function. Adjusting the interface 52 (e.g., tilting, changing the shape of) can be achieved without physical movement of the liquid lens 10 relative to an image sensor, a fixed lens or lens stack, a housing, or other components of a camera module or other module in which the liquid lens 10 can be incorporated. In embodiments, alternating current electrical power is applied to the driving electrode 34 to manipulate the interface 52 between the first liquid 48 and the second liquid 50.

—The Insulating Layer 54—

In embodiments, the insulating layer 54 includes a polymeric material 54*a* and a slippery omniphobic covalently attached liquid 54*b* chemically bonded to the polymeric material. The slippery omniphobic covalently attached liquid 54*b* provides a surface 106 of the insulating layer 54 that contacts one or more of the first liquid 48 and the second liquid 50. In embodiments, as illustrated, the slippery omniphobic covalently attached liquid 54*b* provides the surface 106 of the insulating layer 54 that contacts both the first liquid 48 and the second liquid 50. The polymeric material 54a with the slippery omniphobic covalently attached liquid 54b is a modification of the polymeric material 54a at the surface 106 thereof. Thus, this disclosure refers to the polymeric material 54a so modified, in instances, as a "modified polymer."

In embodiments, the polymeric material 54a of the insulating layer 54 includes a poly(para-xylylene). Poly(para-xylylene) is often commercially referred to as parylene. In embodiments, the polymeric material 54a of the insulating layer 54, which is sometimes referred to commercially as parylene N, has repeating units represented by the following formula

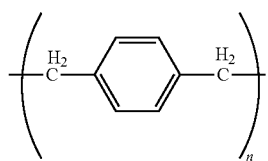

where n is an integer. In embodiments, the polymeric material 54a of the insulating layer 54, which is sometimes referred to commercially as parylene C, has repeating units represented by the formula

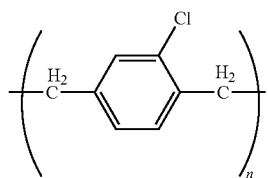

where n is an integer. In embodiments, the polymeric material 54a of the insulating layer 54, which is sometimes referred to commercially as PARYLENE HT® or parylene AF-4, has repeating units represented by the formula

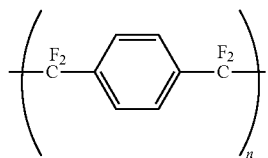

where n is an integer. In embodiments, the polymeric material 54a of the insulating layer 54, which is sometimes referred to commercially as parylene VT4, has repeating units represented by the formula

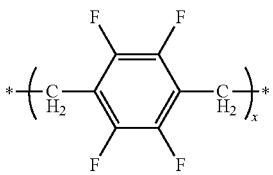

where x is an integer. In embodiments, the polymeric material 54a of the insulating layer 54, which is sometimes referred to commercially as parylene D, has repeating units represented by the formula

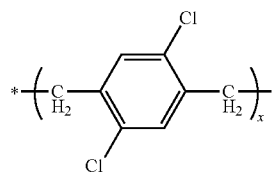

where x is an integer.

In embodiments, the slippery omniphobic covalently attached liquid 54b includes polymer or long alkyl chains bound to repeating units of the polymeric material 54a. For example, in embodiments, the polymer is a silicone, and thus the slippery omniphobic covalently attached liquid 54b includes silicone chains bound to repeating units of the polymeric material 54a. As another example, in embodiments, the desired polymer is a polyolefin or long alkyl chain, and thus the slippery omniphobic covalently attached liquid 54b includes polyolefin or long alkyl chains bound to repeating units of the polymeric material 54a. "Long alkyl chains" includes any alkyl chain having a length of 5 or more carbon atoms.

A variety of reactions can be utilized to chemically bond the slippery omniphobic covalently attached liquid 54b to the polymeric material 54a. For example, a Friedel-Crafts alkylation of parylene N (as the polymeric material 54a) with a halide of a long alkyl chain (desired to form the slippery omniphobic covalently attached liquid 54b), in the presence of $AlCl_3$, generates the following reaction:

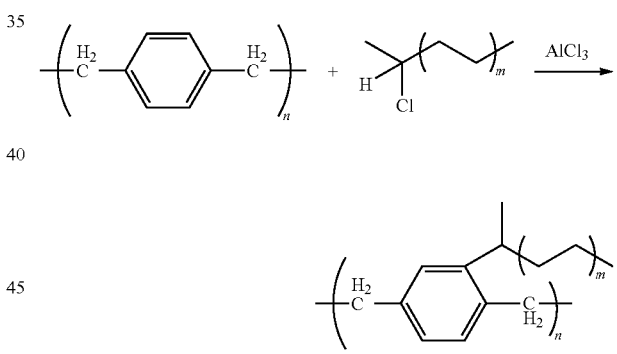

where, n is an integer and m is an integer greater than or equal to 2. The product of the reaction is a slippery omniphobic covalently attached liquid 54b of the long alkyl chains chemically bound to the polymeric material 54a, here parylene N. In embodiments, the product of the reaction represents the insulating layer 54. The above is just one example, and any desired polyolefin or alkyl chain can be grafted onto the repeating units of parylene N in the same manner.

As another example, ultraviolet radiation or a radical initiator (such as a peroxide, e.g., benzoyl peroxide) can break the bond between chlorine and carbon in the repeating units of a chlorinated poly(para-xylylene) such as parylene C (the polymeric material 54a), allowing for the substitution of a silicone chains in the repeating units of the chlorinated poly(para-xylylene) where the chlorine was. An example of this reaction is set forth below

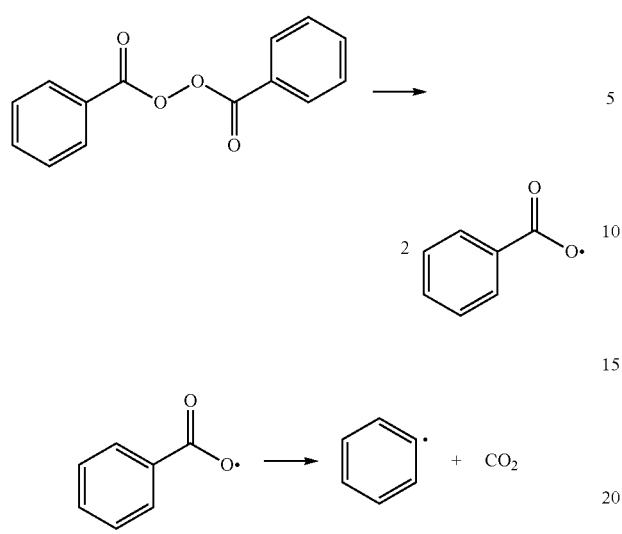

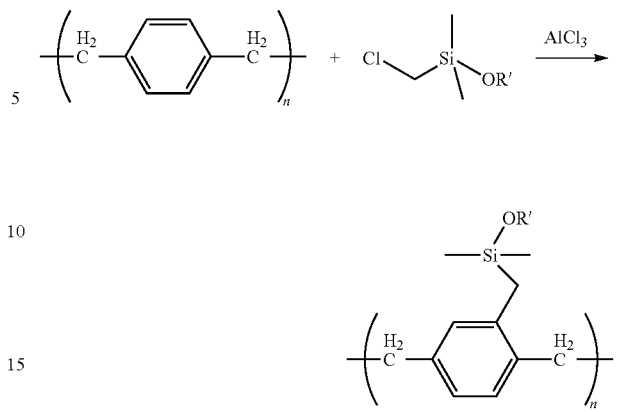

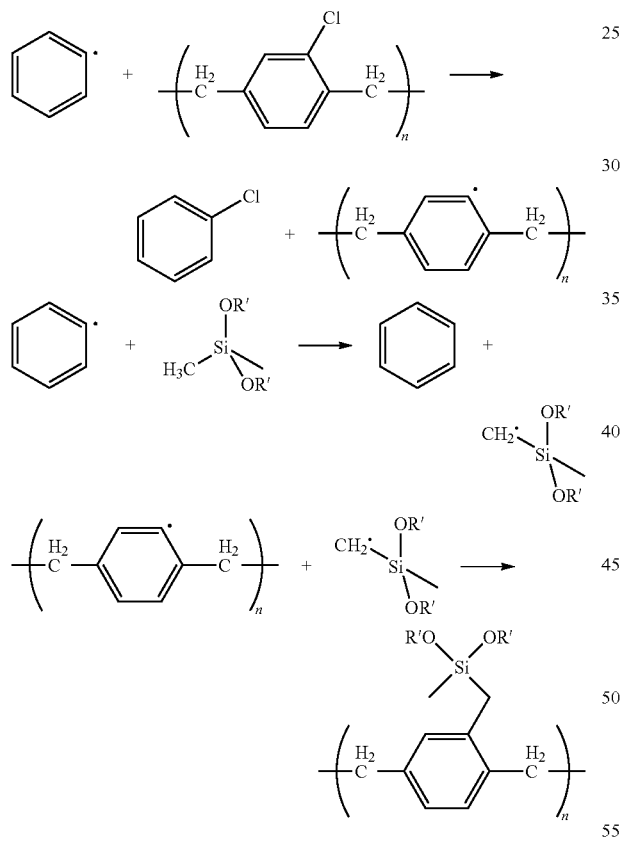

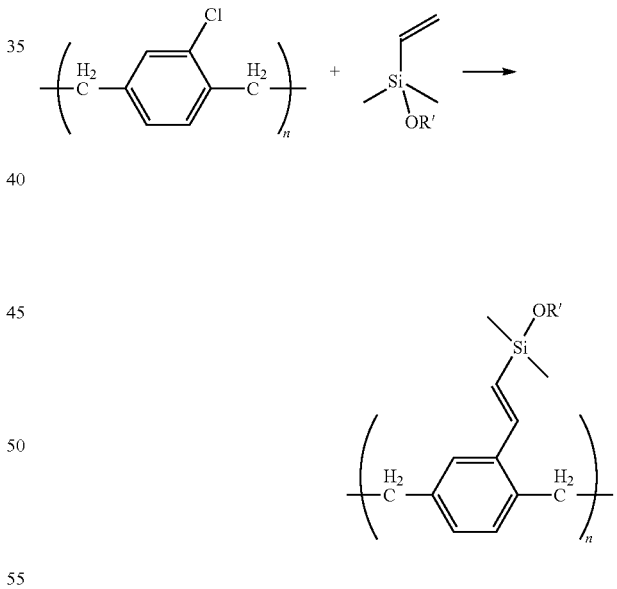

Here, n is an integer greater than 1, and R' is the remainder of the silicone chain. The product of the reaction is a slippery omniphobic covalently attached liquid 54b of chains of the silicone chemically bound to the polymeric material 54a, here parylene C. In embodiments, the product of the reaction represents the insulating layer 54.

As another example, a Mizoroki-Heck reaction of a chlorinated poly(para-xylylene), such as parylene C (as the polymeric material 54a), and a silicone with a vinyl group in the presence of a palladium or platinum catalyst generates the following reaction, wherein the silicone chain replaces the chlorine of the parylene C Here, n is an integer greater than 1, and R' is the remainder of the silicone chain. The product of the reaction is a slippery omniphobic covalently attached liquid 54b of chains of the silicone chemically bound to the polymeric material 54a, here parylene C. In embodiments, the product of the reaction represents the insulating layer 54.

As another example, organometallic replacement of the chlorine in a chlorinated poly(para-xylylene), such as parylene C (as the polymeric material 54a), can graft on chains of a silicone. A simplified illustration of the reaction is below The "n" is an integer greater than 1, and the R's represent the remainder of the silicone. The product of the reaction is a slippery omniphobic covalently attached liquid 54b of chains of the silicone chemically bound to the polymeric material 54a, here parylene C. In embodiments, the product of the reaction represents the insulating layer 54.

As another example, a Friedel-Crafts alkylation of a polymeric material 54a, such as parylene N, with a halide of a silicone polymer in the presence of $AlCl_3$ generates the following reaction

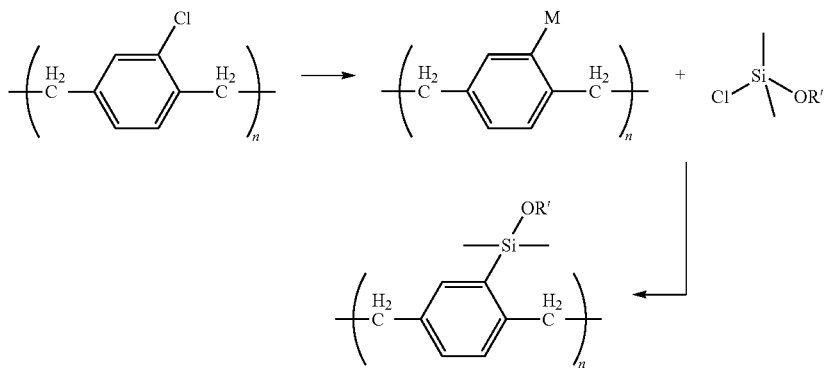

Here, M is a metal, n is any integer greater than 1, and R' is the remainder of the silicone chain. The product of the reaction is a slippery omniphobic covalently attached liquid 54b of chains of the silicone chemically bound to the polymeric material 54a, here parylene C. In embodiments, the product of the reaction represents the insulating layer 54.

As another example, a chlorinated poly(para-xylylene), such as parylene C (as the polymeric material 54a), with a silicone in the presence of a Lewis or Brønsted acid results in the reductive substitution of the chlorine of the repeating units of the chlorinated poly(para-xylylene) with the chain of the silicone. A simplified version of the mechanism is illustrated below

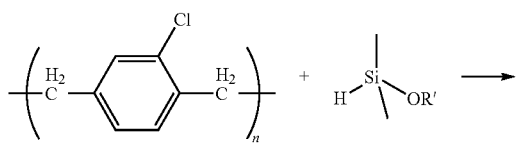

-continued

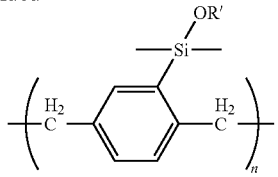

Here, n is an integer greater than 1, and R' is the remainder of the silicone chain. The product of the reaction is a slippery omniphobic covalently attached liquid 54b of chains of the silicone chemically bound to the polymeric material 54a, here parylene C. In embodiments, the product of the reaction represents the insulating layer 54.

The mechanisms described above are examples only and are not meant to limit the ways in which chains of the silicone, polyolefin, or long alkyl can be chemically bound to the polymeric material 54a to form the slippery omniphobic covalently attached liquid 54b on the polymeric material 54a.

In embodiments, by implementing one of the reactions described above, the insulating layer 54 included repeating units that are represented by one or more of the following formulas:

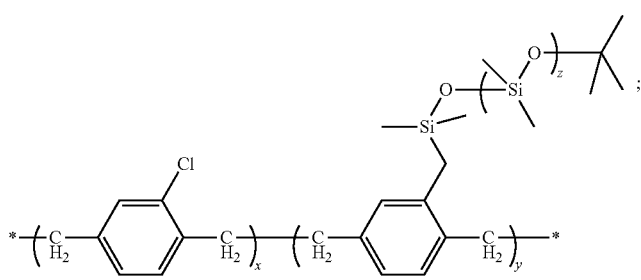

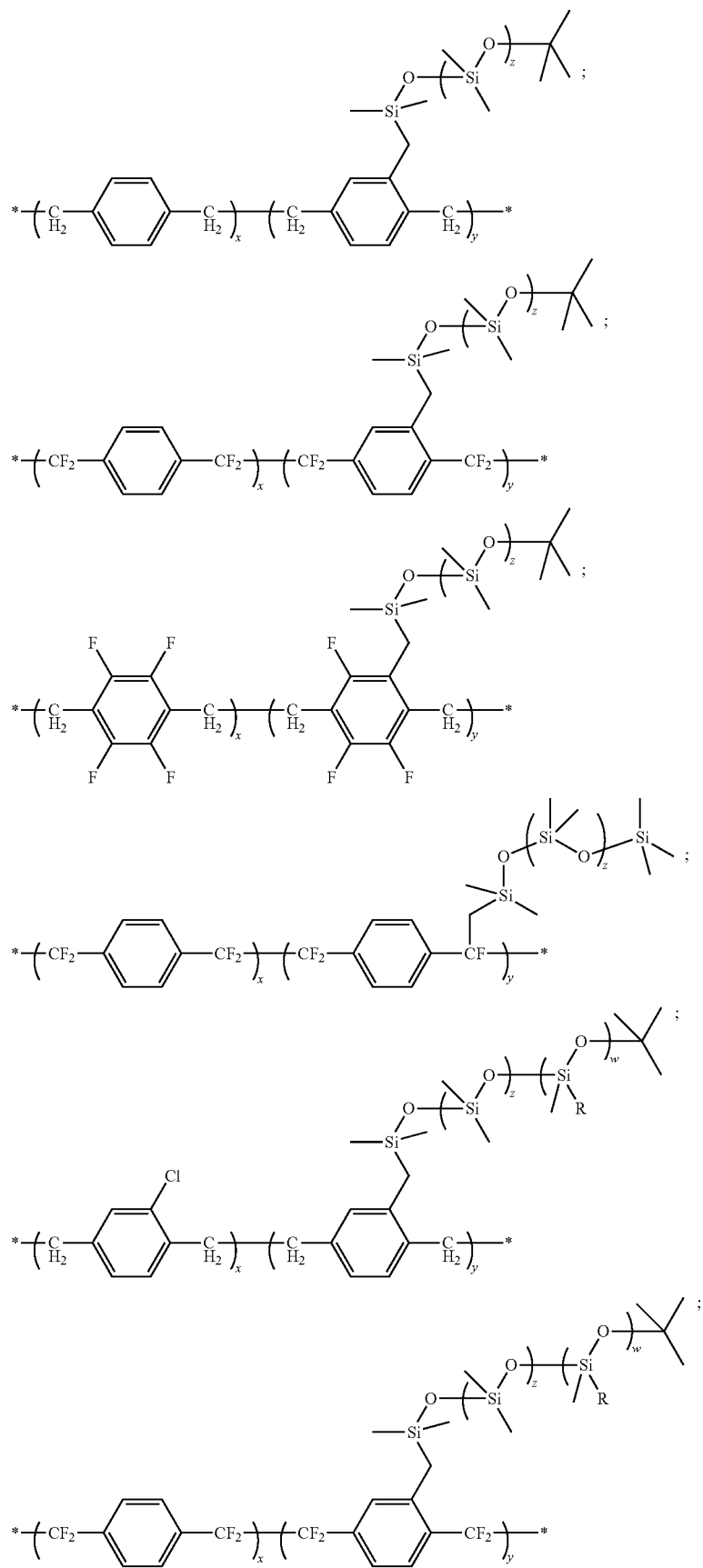

-continued
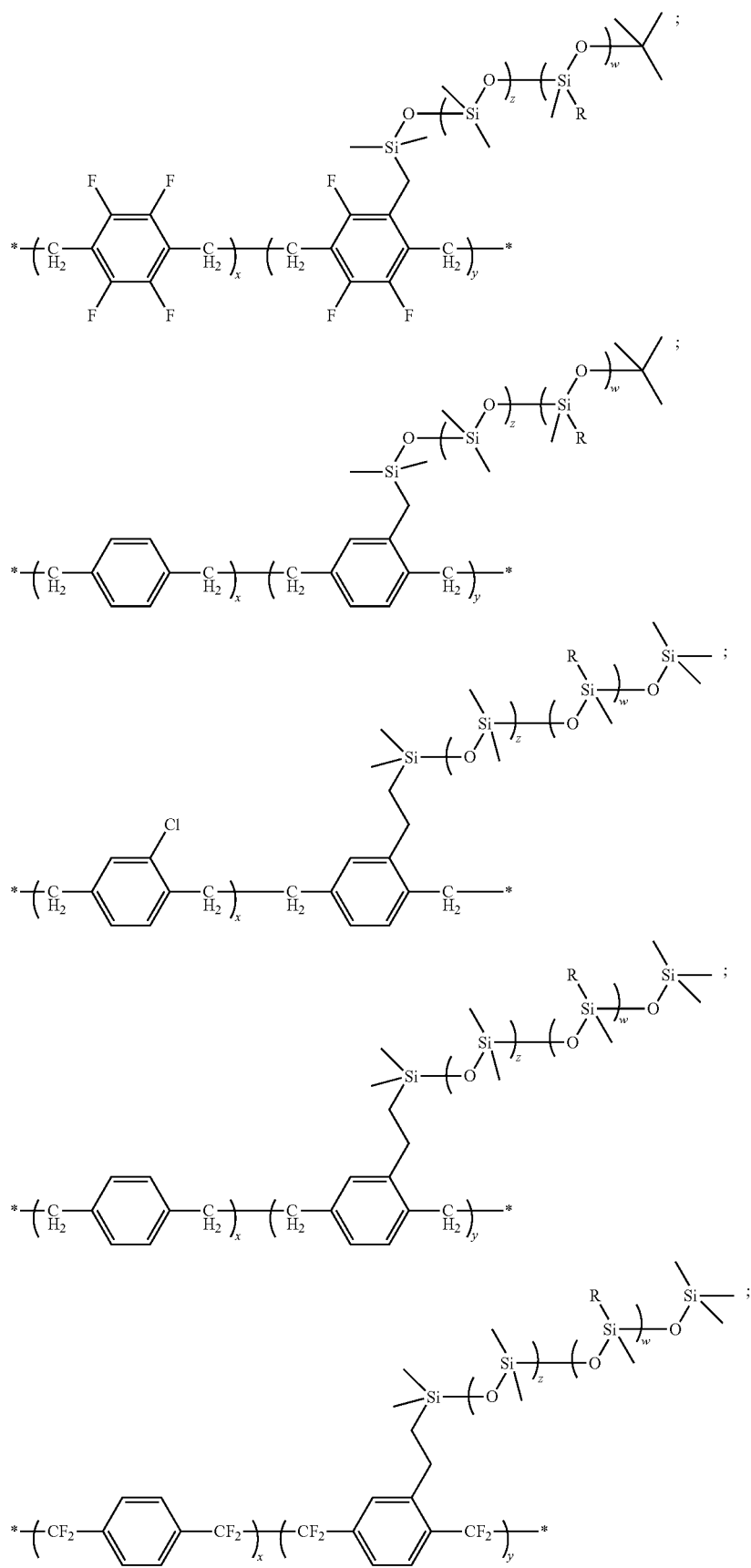

-continued

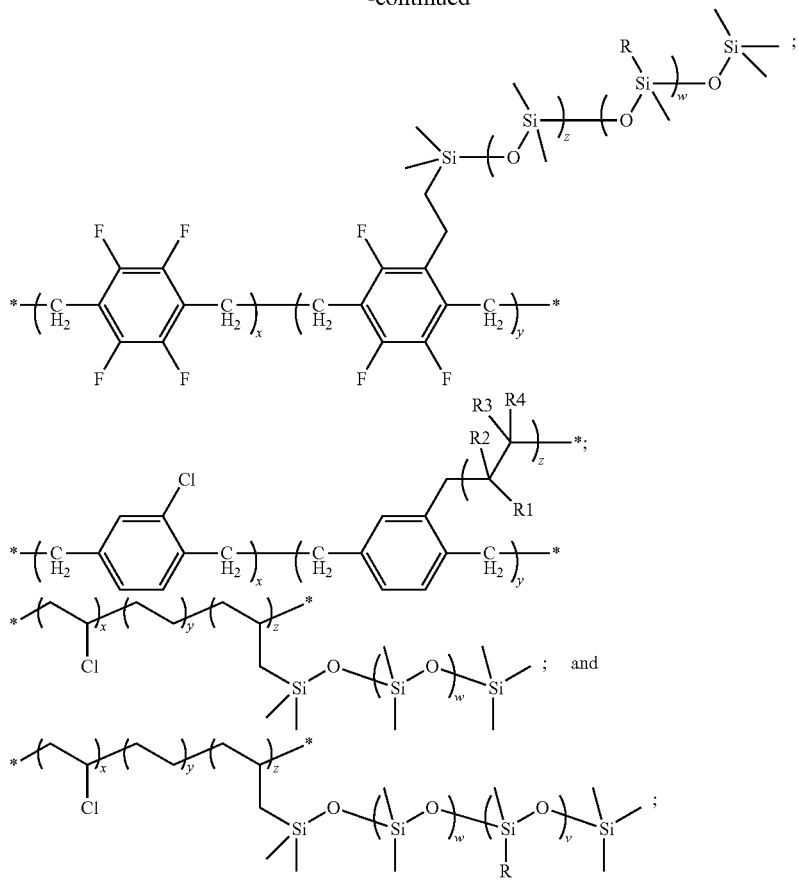

Here, v, w, x, y, z are integers greater than 1, and R, R1, R2, R3, and R4 comprise any one of (i) an hydrogen, (ii) an alkyl chain, (iii) a fluorinated alkyl moiety. R1, R2, R3, R4 can all be the same. R1, R2, R3, R4 can all be different.

The slippery omniphobic covalently attached liquid 54b that is chemically bonded to the polymeric coating 54a has a thickness 55. In embodiments, the thickness 55 is less than or equal to 25 nm.

The slippery omniphobic covalently attached liquid 54b imparts the insulating layer 54 with beneficial contact angle properties. In embodiments, the first liquid 48 (e.g., insulating or non-polar liquid) in the presence of the second liquid 50 (e.g., conducting or polar liquid) forms a contact angle of 20° or less on the surface 106 of the insulating layer 54 that the slippery omniphobic covalently attached liquid 54b provides. In embodiments, dodecane as the first liquid 48 in the presence of a solution of 0.1% w/w potassium acetate in ethylene glycol as the second liquid 50 forms a contact angle of 10° or less on the surface 106 of the insulating layer 54 that the slippery omniphobic covalently attached liquid 54b provides, as described herein. As used herein, "contact angle" is the angle at which a liquid interface meets the solid surface. Contact angle can be measured using a goniometer, such as that produced by from Connelly Applied Research (Nazareth, PA, USA). Contact angle is measured at 5 different sites on each sample and averaged to obtain a value for the contact angle.

In addition, the slippery omniphobic covalently attached liquid 54b imparts the insulating layer 54 with beneficial surface energy. In short, the slippery omniphobic covalently attached liquid 54b has a lower surface energy than commercially available poly(para-xylylenes). In embodiments, the slippery omniphobic covalently attached liquid 54b has a surface energy that is less than or equal to 25 mN/m, and a polar part of the surface energy is less than or equal to 1 mN/m. The lower surface energy of the slippery omniphobic covalently attached liquid 54b broadens the catalog of liquids that can be utilized in the liquid lens 10 as the first liquid 48 and the second liquid 50. Further, as the examples below demonstrate, the insulating layer 54 with the slippery omniphobic covalently attached liquid 54b has a lower hysteresis in optical power than compared to parylene C alone unmodified as the insulating layer 54. The lower surface energy of the slippery omniphobic covalently attached liquid 54b further leads to lower response times in response to changing applied voltage. Finally, because the slippery omniphobic covalently attached liquid 54b is not a coating applied over the insulating layer 54, but rather a chemical modification of the polymeric material 54a of the insulating layer 54 at the surface 106, the insulating layer 54 with the slippery omniphobic covalently attached liquid 54b is more reliable under high temperatures and stressful voltages than other solutions that use a hydrophobic coating over the insulating layer 54.

Further, the insulating layer 54 with the slippery omniphobic covalently attached liquid 54b is highly reliable, rendering the liquid lens 10 highly reliable. In embodiments, the liquid lens 10 passes 1000 or more hours of storage at 85° C. without any increase in optical hysteresis and wavefront error in a useful operating range of the liquid lens 10.

In embodiments, the liquid lens 10 passes 4000 or more hours of storage at 85° C. without any increase in optical hysteresis and wavefront error in a useful operating range. In embodiments, the liquid lens 10 passes 1000 hours of continuous operation at 70V AC 1 kHz and 85° C. without any increase in optical hysteresis and wavefront error in a useful operating range. In embodiments, the liquid lens 10 passes 3000 hours of continuous operation at 70V AC 1 kHz and 85° C. without any increase in optical hysteresis and wavefront error in a useful operating range. In embodiments, the liquid lens 10 passes 10 million actuation cycles at 60° C. without any increase in optical hysteresis and wavefront error in a useful operating range. In embodiments, the liquid lens 10 passes 50 million actuation cycles at 60° C. without any increase in optical hysteresis and wavefront error in a useful operating range. An actuation cycle is mimicked by a 0V to 70V square voltage alternation with a frequency of 3 Hz, modelling powering of the liquid lens 10 to its max voltage and unpowering the liquid lens 10.

—Method 100 of Modifying a Poly(Para-Xylylene) 102 Polymeric Material 54a to Form the Slippery Omniphobic Covalently Attached Liquid 54b on the Polymeric Material 54a—

Figure 2:
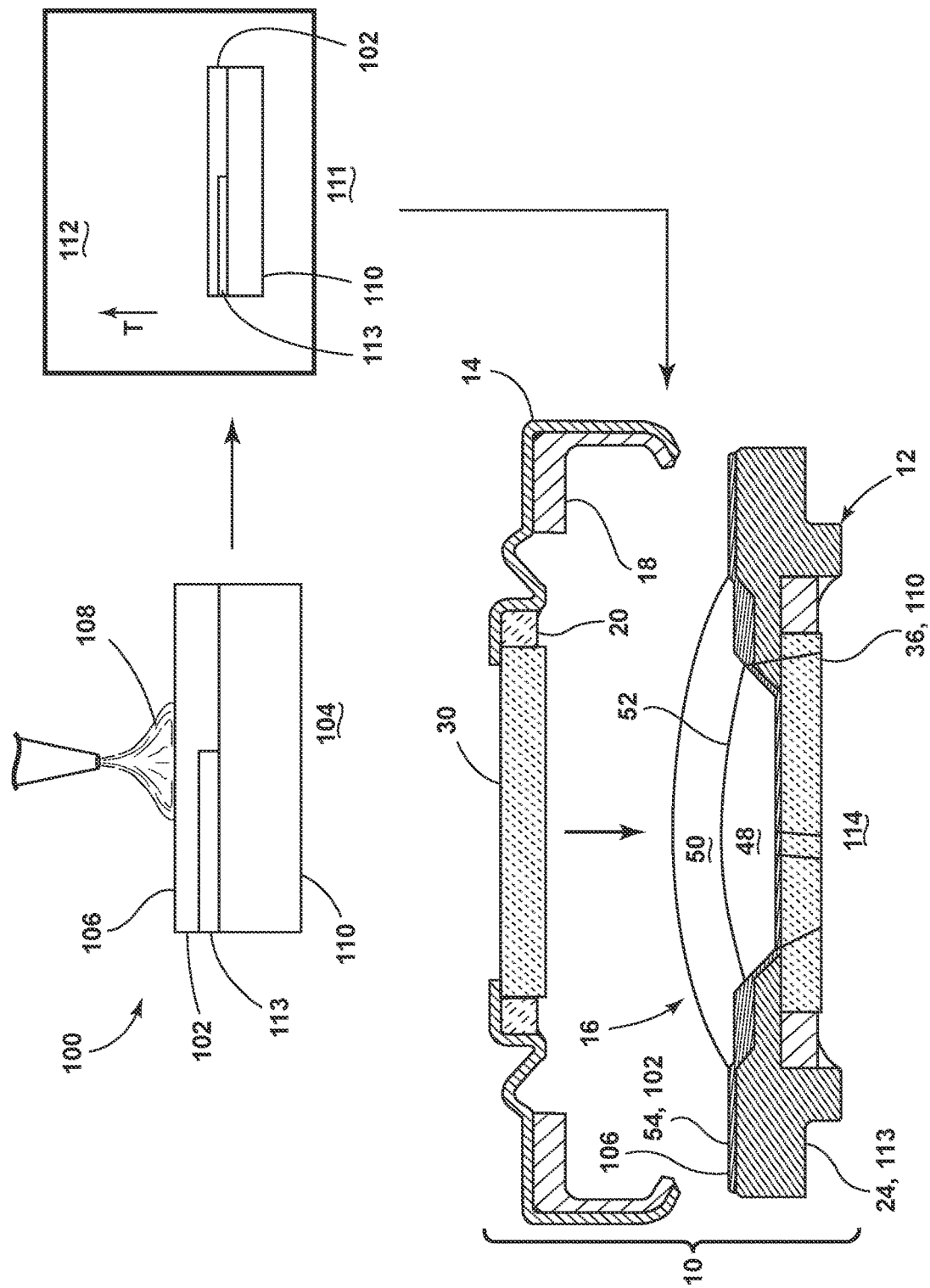
FIG. 2 is a schematic diagram of a method of modifying a polymeric material, illustrating (i) a step of contacting a surface of a poly(para-xylylene) with a solution including a silicone or halogenated polyolefin that reacts with the poly(para-xylylene) to bond units of the silicone or halogenated polyolefin to repeating units of the poly(para-xylylene), resulting in the surface being a slippery omniphobic covalently attached liquid chemically bonded to the poly(para-xylylene), and (ii) a step of forming the liquid lens of FIG. 1 that uses the modified poly(para-xylylene) with the slippery omniphobic covalently attached liquid as the insulating layer.

Referring now to FIG. 2, a method 100 of modifying a poly(para-xylylene) 102, such as to modify the polymeric material 54a of the insulating layer 54, is herein presented. So modifying the poly(para-xylylene) 102 forms the slippery omniphobic covalently attached liquid 54b on the poly(para-xylylene) 102. At a step 104, the method 100 includes contacting a surface 106 of the poly(para-xylylene) 102 with a solution 108 comprising a silicone, a halogenated polyolefin, or a halogenated long alkyl. In embodiments, the poly(para-xylylene) 102 is disposed on a substrate 110 (e.g., the second substrate 36), a conductive material 113 (e.g., the second electrode 24), or both the substrate 110 and the conductive material 113. In embodiments, the poly(para-xylylene) 102 is the polymeric material 54a disposed on the second electrode 24 and second substrate 36 within the containment region 16 of the liquid lens 10, before the first liquid 48 and the second liquid 50 are added and the containment region 16 closed with the cap 14, the gasket 16, and the first substrate 30.

Contacting the surface 106 of the poly(para-xylylene) 102 with the solution 108 changes the poly(para-xylylene) 102, at least at the surface 106 of the poly(para-xylylene) 102. Before being contacted with the solution 108, the surface 106 of the poly(para-xylylene) 102 has a chemical composition, including repeating units as described above. After the poly(para-xylylene) 102 is contacted with the solution 108, the chemical composition of the poly(para-xylylene) 102 at the surface 106 is different—the repeating units of the poly(para-xylylene) 102 now include chains of the silicone, the halogenated polyefin, or the halogenated long alkyl, whichever the solution 108 includes, chemically bonded to repeating units of the poly(para-xylylene), thus forming the slippery omniphobic covalently attached liquid 54b on the poly(para-xylylene) 102.

In embodiments, the solution 108 includes a silicone. In embodiments, the silicone is a polydimethylsiloxane homopolymer or copolymer.

In embodiments, the silicone is a copolymer of dimethysiloxane and methylfluoroalkylsiloxane. In embodiments, the methylfluoroalkylsiloxane is tridecafluorooctylmethylsiloxane. An example is product code FMS-736 from Gelest, Inc. (Morrisville, PA, USA).

In embodiments, the silicone is a vinyl-terminated polydimethylsiloxane homopolymer or copolymer. An example is product code DMS-V31 from Gelest, Inc. (Morrisville, PA, USA). In embodiments, the silicone is chloromethyl terminated polydimethylsiloxane homopolymer or copolymer. An example is product code DMS-L21 (from Gelest, Inc., Morrisville, PA, USA). In embodiments, the silicone is a trimethylsiloxy terminated polydimethylsiloxane homopolymer or copolymer. Examples are product code DMS-T25 from Gelest, Inc. (Morrisville, PA, USA), and product code DMS-T02 from Gelest, Inc. (Morrisville, PA, USA)). In embodiments, the silicone is a methylhydrosiloxane/dimethylsiloxane copolymer. An example is product code HMS053 (from Gelest, Inc., Morrisville, PA, USA).

In embodiments, the solution 108 includes a halogenated polyolefin. In embodiments, the halogenated polyolefin is a chlorinated polyethylene. Other halogenated polyolefins are envisioned such as chlorinated polypropylene.

In embodiments, the poly(para-xylylene) 102 subjected to the method 100 includes repeating units of one or more of the following formulas

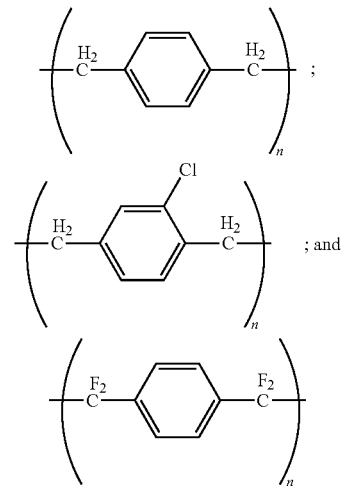

where n is an integer. As mentioned above, those polymers are known commercially, in sequence as, parylene N, parylene C, and parylene AF-4 and PARYLENE HT® (a registered trademark of Specialty Coating Systems, Inc., Indianapolis, Indiana, USA).

In embodiments, the solution 108 further includes one or more catalysts. In embodiments, the solution 108 further includes a Karstedt catalyst. In embodiments, the solution 108 further includes a palladium complex catalyst. In embodiments, the solution 108 further includes aluminum chloride. In embodiments, the solution 108 further includes a peroxide, such as benzoyl peroxide or dicumyl peroxide.

In embodiments, at a step 111, the method 100 further includes subjecting the contacted poly(para-xylylene) 102 that the solution 108 contacted to an environment 112 that has a temperature above room temperature. The elevated temperature of the environment 112, in embodiments, facilitates the reaction between the poly(para-xylylene) 102 and the reactive species of the solution 108 (e.g., the silicone, the halogenated polyolefin, or the long alkyl chain) that changes the composition of the poly(para-xylylene) 102 at the surface 106 thereof so that the chains of the silicone, the halogenated polyefin, or the halogenated long alkyl, whichever the solution 108 includes, are chemically bonded to repeating units of the poly(para-xylylene), thus forming the slippery omniphobic covalently attached liquid 54b on the poly(para-xylylene) 102. In embodiments, the temperature is 75° C. to 180° C. In embodiments, the environment 112 comprises air. In embodiments, the environment 112 comprises inert argon.

As discussed above, the modification of the poly(para-xylylene) 102 (as the polymeric material 54a) to include the slippery omniphobic covalently attached liquid 54b thereupon drastically lowers the contact angle that the non-polar liquid (e.g., first liquid 48), in the presence of a polar liquid (i.e., the second liquid 20), forms on the surface 106 thereof. In embodiments, before contacting the poly(para-xylylene) 102 with the solution 108, a non-polar liquid (e.g., first liquid 48) disposed on the surface 106 of the poly(para-xylylene) 102 in the presence of a polar liquid (e.g., the second liquid 50) forms a first contact angle that is greater than or equal to 50°. In explained in the Background, such contact angles are formed when dodecane is on parylene C in the presence of a polar liquid solution of 0.1% w/w potassium acetate in ethylene glycol. However, after contacting the poly(para-xylylene) 102 with the solution 108 (and forming the slippery omniphobic covalently attached liquid 54b thereupon), the non-polar liquid (e.g., first liquid 48) disposed on the surface 106 (now provided by the slippery omniphobic covalently attached liquid 54b) in the presence of the polar liquid (e.g., the second liquid 50) forms a second contact angle that is less than or equal to 30 degrees. In embodiments, the second contact angle is less than or equal to 20 degrees.

In embodiments, before contacting the poly(para-xylylene) 102 with the solution 108, the poly(para-xylylene) 102 is disposed as the polymeric material 54a of the insulating layer 54 on the second electrode 24 and the second substrate 36 as part of the base 12 (of what is intended to be the liquid lens 10). The solution 108 is then applied to the poly(para-xylylene) 102 as the polymeric material 54a, resulting in the formation of the slippery omniphobic covalently attached liquid 54b on the polymeric material 54a, and the insulating layer 54 is thereafter rinsed. In such circumstances, in embodiments, at a step 114, the method 100 further comprises (i) depositing the first liquid 48 and the second liquid 50 within the containment region 16 and (ii) closing the containment region 16 with the cap 14, the gasket 18, the first electrode 20, and the first substrate 30. Closing the containment region 16 with the cap 14, the gasket 18, the first electrode 20, and the first substrate 30 traps the first liquid 48 and the second liquid 50 within the containment region 16. The interface 52 forms between the first liquid 48 and the second liquid 50. The slippery omniphobic covalently attached liquid 54b on the polymeric material 54a forms at least the surface 106 of the insulating layer 54 contacting the first liquid 48 and the second liquid 50.

Embodiments of the liquid lens 10 are thus formed. The insulating layer 54 is the product of contacting the poly (para-xylylene) 102 as the polymeric material 54a with the solution 108 comprising the silicone, the halogenated polyolefin, or the long alkyl chain. So contacting the poly(para-xylylene) 102 as the polymeric material 54a with the solution 108 results in a change in chemical composition of the insulating layer 54 at the surface 106—more specifically, the formation of the slippery omniphobic covalently attached liquid 54b at the surface 106.

—Liquid Lens 10 Operable Under Direct Current Electrical Power—

Further relevant to the second problem identified in the Background, it has been discovered that materials with a low dielectric dissipation factor are useful as the insulating layer 54 for the liquid lens 10 operated with direct current electrical power. As mentioned, the insulating layer 54 includes a dielectric material. A dielectric material is an electrical insulator (i.e., electrical current does not pass through the material). However, the dielectric material can become polarized when an electric field is applied to the dielectric material. Positive charges within the dielectric material become aligned with the field, and negative charges within the dielectric material become aligned against the field. Permittivity ($\varepsilon$) is a measure of how polarizable the dielectric material is—the higher the permittivity ($\varepsilon$) the more polarizable the dielectric material is and thus the more energy the dielectric material stores in response to the electric field. The relative permittivity ($\varepsilon_r$) (sometimes referred to as "dielectric constant") is the permittivity ($\varepsilon$) of the material divided by the permittivity of free space ($\varepsilon_0$). The relative permittivity is thus a dimensionless value and has real ($\varepsilon'_r$) and imaginary parts ($\varepsilon''_r$).

Permittivity ($\varepsilon$) and thus relative permittivity ($\varepsilon_r$) are a function of frequency ($\omega$) of the applied electromagnetic field. Thus, relative permittivity is $\varepsilon_r(\omega)=\varepsilon'_r(\omega)-i\varepsilon''_r(\omega)$. The imaginary part is attributed to bound charge and dipole relaxation, and the $i\varepsilon''_r(\omega)$ can be thought of as heat that the dielectric material dissipates in response to the applied electromagnetic field.

To reduce electrical power consumption of the liquid lens 10, the real part $\varepsilon'_r(\omega)$ of the relative permittivity ($\varepsilon_r(\omega)$) should be sufficient to perform as a dielectric material for the liquid lens 10, and the imaginary part ($\varepsilon''_r(\omega)$) should be low so as to avoid electrical power loss in the form of heat dissipation. A loss tangent quantifies this ratio as follows:

$$\tan\delta(\omega) = \frac{\varepsilon''_r(\omega)}{\varepsilon'_r(\omega)}$$

The loss tangent is also referred to the "Dielectric Dissipation Factor." The inverse of the loss tangent is sometimes referred as the "Quality Factor." The imaginary part (($\varepsilon''_r(\omega)$)) is sometimes referred to as the "loss modulus" of the material.

As mentioned, in embodiments, instead of alternating current, direct current electrical power is applied to the second electrode 24 to manipulate the interface 52 between the first liquid 48 and the second liquid 50. There is a strong correlation between (i) the performance of the insulating layer 54 under application of direct current and (ii) the loss tangent, or more specifically, the imaginary part (($\varepsilon''_r(\omega)$)) of the insulating layer 54 under application of alternating current. The imaginary part (($\varepsilon''_r(\omega)$)) again can be thought of as heat loss due in part to dipole relaxation. When a direct current is applied, all the dipoles still become aligned with the electric field—a state referred to as the polarization phase. However, this alignment (i.e., for the material to reach the polarization phase) takes time. That period of time the material requires to reach the polarization phase appears to be proportional to the imaginary part (($\varepsilon''_r(\omega)$)). In other words, materials with a relatively high dielectric dissipation factor—meaning a relatively high imaginary part (($\varepsilon''_r(\omega)$))—require a relatively long time to align dipole in response to an applied direct current. And, the longer the time it takes for the material to reach the polarization phase, the more unsuitable the material is for application as the insulating layer 66 in the liquid lens 10, when direct current or low frequency alternating current is utilized.

In embodiments, the insulating layer 54 has a quality factor that of at least 200, when measured under alternating current having a frequency of 1 kHz. For purposes of the present disclosure, impedance spectroscopy is utilized to measure the dielectric dissipation factor (and thus quality factor) of a material as a function of frequency of an alternating current applied to the material. When the quality factor at least 200, the liquid lens 10 can then be (and in embodiments) is actuated under either (i) direct current or (ii) alternating current having a frequency of less than or equal to 0.1 Hz. The liquid lens 10 can thus operate with little electrical power and be energy efficient.

As discussed, the insulating layer 54, in embodiments, includes the polymeric material 54a, which can comprise a poly(para-xylylene). In embodiments of the liquid lens 10 operated under either (i) direct current or (ii) alternating current having a frequency of less than or equal to 0.1 Hz, the poly(para-xylylene) can suitably have repeating units of one or more of the following formulas

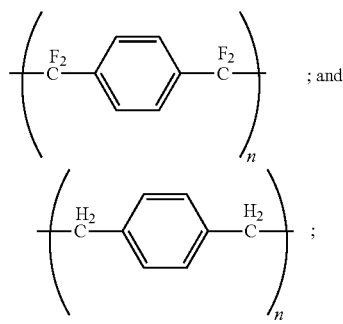

where n is an integer. Those polymers are commercial known as PARYLENE HT® and parylene N, respectively. Impedance spectroscopy has measured the real part $\varepsilon'_r(\omega)$) and imaginary part ($\varepsilon''_r(\omega)$) of the relative permittivity ($\varepsilon_r(\omega)$) of parylene N to be about 2.6 and 0.01, respectively, at the frequency of 0.1 Hz at 20° C., for a loss tangent tan $\delta(0.1\ Hz)$ of 0.004 (or Quality Factor of 250). To contrast, impedance spectroscopy has measured the real part $\varepsilon'_r(\omega)$) and imaginary part ($\varepsilon''_r(\omega)$) of the relative permittivity ($\varepsilon_r(\omega)$) of the poly(para-xylylene) commercially referred to as parylene C to be about 4 and 0.15 at the frequency of 0.1 Hz at 20° C., for a loss tangent tan $\delta(0.1\ Hz)$ of 0.038 (or Quality Factor of 27).

In embodiments, the polymeric material 54a of the insulating layer 54 includes both parylene C and parylene N. Such a polymeric material 54a would include some of the qualities of parylene C but with a more acceptable loss tangent making the insulating layer 54 suitable for direct current applications.

In embodiments, the insulating layer 54 includes the slippery omniphobic covalently attached liquid 54b chemically bonded to the polymeric material 54a, as explained above. The slippery omniphobic covalently attached liquid 54b imparts durability to the polymeric material 54a, rendering the liquid lens 10 commercially practical. Liquid lenses 10 including insulating layers 54 with the polymeric material 54a alone (such as parylene N without the slippery omniphobic covalently attached liquid 54b) may not be durable enough to be commercially practical for some applications.

EXAMPLES

Example 1—For Example 1, three silicon coupons were coated with a layer of parylene C having a thickness of 4.2 µm and hereinafter referred to as Sample 1A, Sample 1B, and Sample 1C. Sample 1A and Sample 1B are control samples, as hereinafter described. Dodecane was mixed with ethylene glycol for subsequent use to determine the contact angle on the samples. The contact angle of the mixed dodecane in the presence of ethylene glycol on the layer of parylene C of Sample 1A was 61°.

For Sample 1B, also a control sample, a drop of a vinyl-terminated polydimethylsiloxane alone (product code DMS-V31 from Gelest, Inc. (Morrisville, PA, USA)) was then placed onto the layer of parylene C. The Sample 1B was then placed in an environment of air having a temperature of 85° C. for a time period of 1 hours and 30 minutes. After that, the sample was rinsed with a silicone oil (more specifically, a trimethylsiloxy terminated polydimethylsiloxane obtained under product code DMS-T02 from Gelest, Inc. (Morrisville, PA, USA)). The sample was then rinsed with acetone. The sample was then rinsed with water. The sample was then rinsed with isopropanol. The sample was then blown with air until dry. The mixed dodecane with ethylene glycol was then placed on Sample 1B. The contact angle of the dodecane in the presence of ethylene glycol was determined to be 71°. Sample 1B versus Sample 1A demonstrates that mere contacting the parylene C with the vinyl-terminated polydimethylsiloxane had no beneficial effect for contact angle and actually increased the contact angle of the non-polar liquid dodecane.

For Sample 1C, a solution was prepared by mixing the following components:

| | |
|---|---|
| 99 wt % | a vinyl-terminated polydimethylsiloxane |
| 1 wt % | 1 wt % platinum in vinyl-terminated polydimethylsiloxane |

The vinyl-terminated polydimethylsiloxane was again product code DMS-V31 from Gelest, Inc. (Morrisville, PA, USA). The vinyl-terminated polydimethylsiloxane is believed to have an average molecular weight of approximately 28,000 grams per mole. The vinyl-terminated polydimethylsiloxane is believed to be represented by the formula below, where n is an integer that produces, on average, the believed molecular weight.

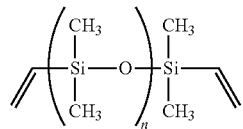

The 1 wt % platinum in vinyl-terminated polydimethylsiloxane was obtained under product code SIP6830.1 from Gelest, Inc. (Morrisville, PA, USA). The 1 wt % platinum in vinyl-terminated polydimethylsiloxane is believed to be, in order of decreasing weight percentage, (i) monovinyl terminated polydimethylsiloxane, (ii) platinum, 1,3-diethenyl-1,1,3,3-tetramethyldisiloxane complexes, and (iii) divinyltetramethyldisiloxane.

One drop of the solution was then placed onto the layer of parylene C of Sample 1C. Sample 1C was then placed in an environment of air having a temperature of 85° C. for a time period of 1 hours and 30 minutes. After that, the sample was rinsed with a silicone oil (more specifically, a trimethylsiloxy terminated polydimethylsiloxane obtained under product code DMS-T02 from Gelest, Inc. (Morrisville, PA, USA)). The sample was then rinsed with acetone. The sample was then rinsed with water. The sample was then rinsed with isopropanol. The sample was then blown with air until dry.

The mixed dodecane with ethylene glycol was then placed on the modified layer of parylene of Sample 1C. The contact angle of the dodecane in the presence of ethylene glycol was determined to be 23°. The contact angle of 23° is a major improvement over the control Sample 1A (61°). The difference in contact angle for Sample 1C (23°) compared to Sample 1A (61°) demonstrates that the chemical composition of the parylene C at the surface had changed, which appears to be attributable to the inclusion of the platinum in vinyl-terminated polydimethylsiloxane. Without being bound by theory, it is believed that the platinum operates as a Karstedt's catalyst of sorts that facilitates a Mizoroki-Heck reaction where the vinyl-terminated polydimethylsiloxane replaces the chlorine in the repeating units of parylene C. A simplified illustration of the reaction is believed to be as follows

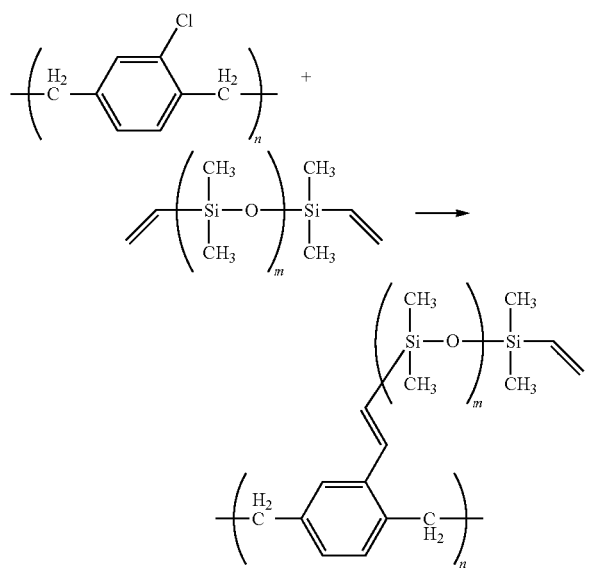

Here, n and m are integers. Literature known to the inventor does not describe what the inventor believes the reaction to be. In any event, it is clear from Sample 1B compared to Sample 1C that a reaction is taking place and the repeating units of the parylene C are being modified at the surface to form a slippery omniphobic covalently attached liquid chemically bonded thereto. The slippery omniphobic covalently attached liquid includes chains of the polydimethylsiloxane.

A liquid lens was prepared with parylene C as the insulating layer. The insulating layer was then contacted with the solution used for Sample 1C and subsequently heated, rinsed, and dried in the same manner as Sample 1C. The insulating layer thus became parylene C with chains of the polydimethylsiloxane chemically bonded thereto forming a slippery omniphobic covalently attached liquid. The slippery omniphobic covalently attached liquid provided the surface of the of the insulating layer. A first liquid and a second liquid were added and a top outer layer applied to form the liquid lens. The first liquid and the second liquid were in contact with the surface that the slippery omniphobic covalently attached liquid provided.

Figure 3:
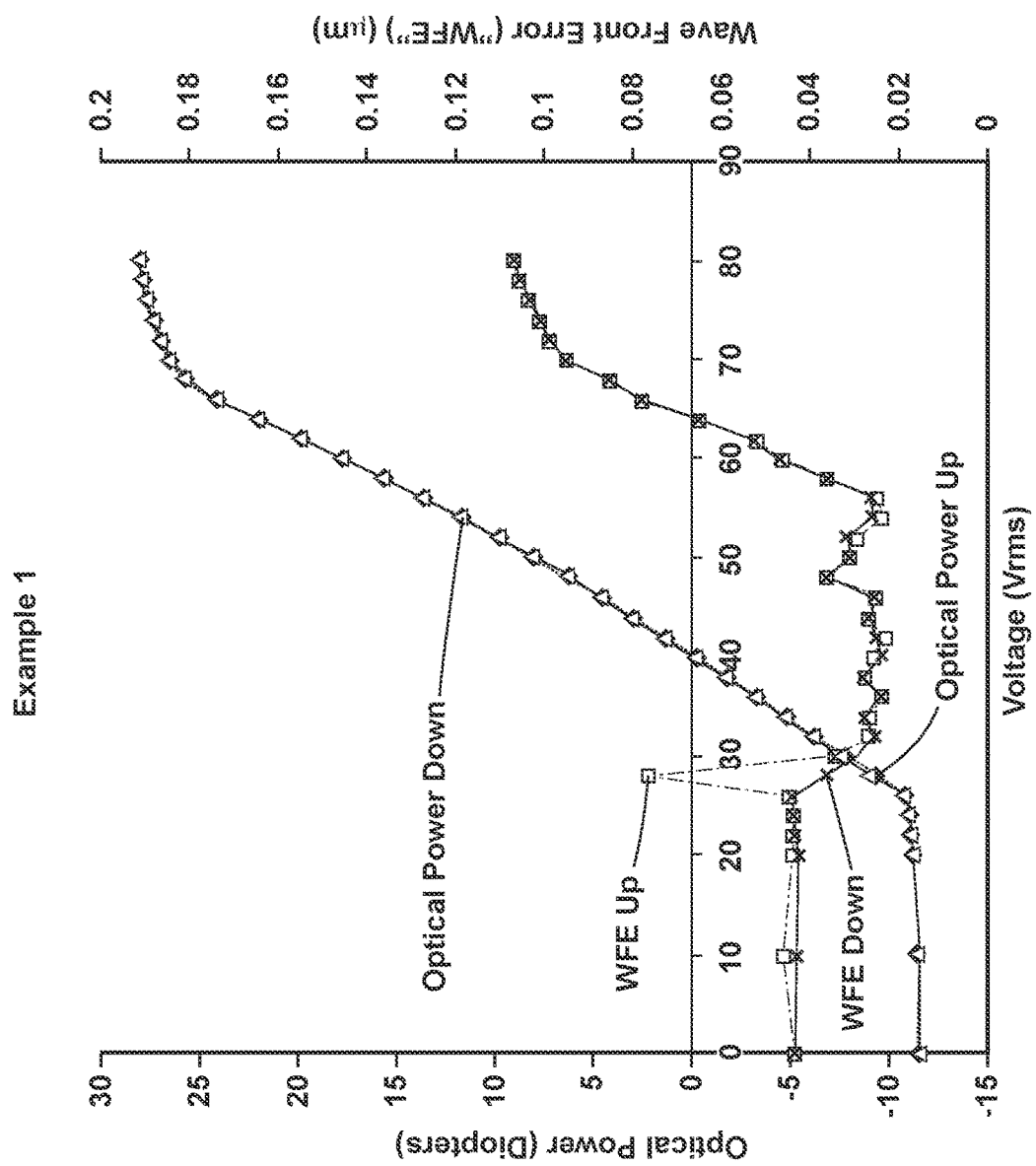
FIG. 3 is a graph pertaining to an Example 1 that plots optical power and wavefront error as a function of voltage applied for the liquid lens of FIG. 1 that utilizes the poly(para-xylylene) and a slippery omniphobic covalently attached liquid that is chemically bonded thereto as the insulating layer, illustrating minimal hysteresis in both optical power and wavefront error.

Referring now to FIG. 3, an electro-optical curve was generated based on measurements of the liquid lens—more specifically, both optical power and wavefront error were measured and graphed as a function of applied voltage. The results show a wide range of optical powers available. In addition, the optical power as a function of voltage from 0 $V_{rms}$ to 80 $V_{rms}$ ("Optical Power Up") differs very little from the optical power as a function of voltage from 80 $V_{rms}$ back down to 0 $V_{rms}$ ("Optical Power Down"). The maximum hysteresis measured between −5 Diopters, and +13 Diopters i.e., the maximum difference between (i) the optical power produced at a given voltage setting the lens at an optical power between −5 Diopters, and +13 Diopters before increasing voltage and (ii) the optical power produced at the same voltage after increasing to the maximum voltage of 80 $V_{rms}$, and then decreasing voltage back down to the reference voltage was approximately 0.4 diopter. In this example, −5 Diopters, and +13 Diopters is defined as the operating diopter range of the lens.

For comparison, a liquid lens was prepared using a layer of parylene C as the insulating layer, without being contacted with the solution and without a separate hydrophobic layer disposed on the layer of parylene C. The liquid lens was not functional, presumably because the contact angle of the non-polar liquid was too high on the layer of parylene C. A liquid lens using parylene C as the insulating layer, including a hydrophobic layer over the parylene C, and using the same liquid produces a hysteresis above 2 diopters.

Example 2—For Example 2, two silicon coupons were coated with a layer of parylene C having a thickness of 3.6 μm, hereinafter referred to as Sample 2A and Sample 2B. Sample 2A is a control sample. Dodecane was mixed with ethylene glycol for subsequent use to determine the contact angle on the samples. The contact angle of the dodecane in the presence of ethylene glycol on the layer of parylene C of Sample 2A was over 60°.

A solution was prepared with the following components

| 10 grams | trimethylsiloxy terminated polydimethylsiloxane |
| 50 milligrams | dicumyl peroxide |

The trimethylsiloxy terminated polydimethylsiloxane was obtained as product code DMS-T25 from Gelest, Inc. (Morrisville, PA, USA). The chemical structure of the trimethylsiloxy terminated polydimethylsiloxane is believed to be represented by the formula below

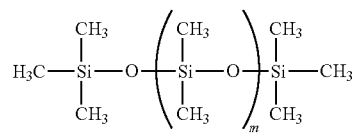

One drop of the solution was then applied to the parylene C of Sample 2B. Then, Sample 2B was subject to an environment of inert argon having a temperature of 160° C. for a time period of 2 hours. Then, Sample 2B was rinsed with a silicone oil (more specifically, a trimethylsiloxy terminated polydimethylsiloxane obtained under product code DMS-T02 from Gelest, Inc. (Morrisville, PA, USA)). The sample was then rinsed with acetone. The sample was then rinsed with water. The sample was then rinsed with isopropanol. The sample was then blown with air until dry. The solution modified the parylene C at the surface, resulting in the formation of a slippery omniphobic covalently attached liquid chemically bonded thereto. The slippery omniphobic covalently attached liquid includes chains of the polydimethylsiloxane from the solution.

The thickness of the layer of the modified parylene C of Sample 2B was then measured. The measured thickness was again 3.6 µm—the thickness of the slippery omniphobic covalently attached liquid was not significant compared to the thickness of the parylene C. To confirm that the chains of the polydimethylsiloxane were chemically bonded onto the parylene C, thus forming the slippery omniphobic covalently attached liquid, an analysis was performed on both Sample 2A and then Sample 2B using a scanning electron microscope ("SEM") with energy dispersive X-ray spectroscopy ("EDS"). Sample 2B at the surface of the modified parylene C included about 5% more atomic silicon and about 10% more atomic oxygen than was measured to be present at the surface of the unmodified parylene C of Sample 2A. The results demonstrate that contacting the parylene C with the solution described above resulted in a change in chemical composition at the surface, even if the thickness was not significantly changed.

If the solution just resulted in a coating over the surface of the parylene C, the thickness of the parylene layer would have increased for Sample 2B relative to Sample 2A. However, the thicknesses of the parylene layers were the same for both Sample 2A and Sample 2B, and the chemical composition of the parylene layers at the surface were shown to be different according to the SEM-EDS analysis.

Some ellipsometry was done to have an estimation of this thickness of the slippery omniphobic covalently attached liquid. The control Sample 2A and Sample 2B with the solution-modified parylene C have both been studied by ellipsometry to detect the slippery omniphobic covalently attached liquid. On Sample 2A, the ellipsometry demonstrated a single layer having an index of 1.63 and a thickness of 3.6 µm. On Sample 2B, the ellipsometry demonstrated a first layer having an index of 1.62 and a thickness of 3.6 microns and a second layer having and index of 1.22 and a thickness of 22 nm. The very low index of the second layer confirms a low density, highly consistent with its liquid-like behavior.

It is believed that the dicumyl peroxide of the solution acted as a radical initiator that broke the bond between the chlorine and carbon in the repeating units of parylene C at the surface, which allowed the substitution of trimethylsiloxy terminated polydimethylsiloxane for the chlorine. The resulting modified parylene C is believed to have repeating units represented by the following formula

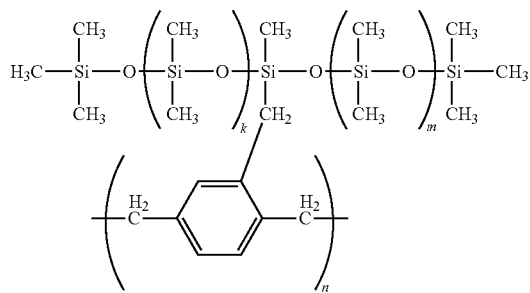

The letters k, m, and n here are integers.

The contact angle of the dodecane in the presence of ethylene glycol on the slippery omniphobic covalently attached liquid of the modified parylene C of Sample 2B was measured to be 10°, which is a decrease in about 50° compared to the layer of non-modified parylene C of Sample 2A. The sample of 2B was then rinsed with acetone. The contact angle of the dodecane in the presence of ethylene glycol on Sample 2B was measured again, and the measured contact angle was 17°.

Example 3—For Example 3, two silicon coupons were coated with a layer of PARYLENE HT®, hereinafter referred to as Sample 3A and Sample 3B. Sample 3A is a control sample. Dodecane was mixed with ethylene glycol for subsequent use to determine the contact angle on the samples. The contact angle of the dodecane in the presence of ethylene glycol on the layer of PARYLENE HT® of Sample 3A was over 90°.

A solution was prepared with the following components

| | |
|---|---|
| 10 grams | trimethylsiloxy terminated polydimethylsiloxane |
| 50 milligrams | dicumyl peroxide |

This is the same solution as the solution used for Example 2. One drop of the solution was then applied to the PARYLENE HT® of Sample 3B. Then, Sample 3B was subject to an environment of inert argon having a temperature of 160° C. for a time period of 2 hours. Then, Sample 3B was rinsed with a silicone oil (more specifically, a trimethylsiloxy terminated polydimethylsiloxane obtained under product code DMS-T02 from Gelest, Inc. (Morrisville, PA, USA)). The sample was then rinsed with acetone. The sample was then rinsed with water. The sample was then rinsed with isopropanol. The sample was then blown with air until dry. The solution modified the PARYLENE HT® at the surface, resulting in the formation of a slippery omniphobic covalently attached liquid chemically bonded thereto. The slippery omniphobic covalently attached liquid includes chains of the polydimethylsiloxane from the solution.

The contact angle of the dodecane in the presence of ethylene glycol on the surface of Sample 3B that the slippery omniphobic covalently attached liquid provided was measured to be 16°, which is a decrease in about 74° compared to the non-modified PARYLENE HT® of Sample 3A.

It is believed that the dicumyl peroxide of the solution acted as a radical initiator that broke the bond between the fluorine and carbon in the repeating units of PARYLENE HT® at the surface thereof, which allowed the substitution of chains of the trimethylsiloxy terminated polydimethylsiloxane for the chlorine. The repeating units of modified PARYLENE HT® at the surface are believed be represented by the following formula

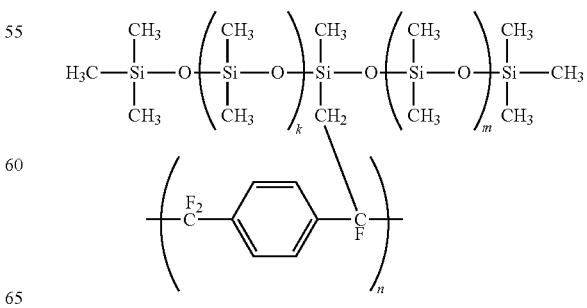

The letters k, m, and n here are integers.

Example 4—For example 4, two silicon coupons were coated with a layer of parylene C, hereinafter referred to as Sample 4A and Sample 4B. Sample 4A is a control sample. A solution was prepared with the following components:

| | |
|---|---|
| 10 grams | (15-20% tridecafluorooctylmethylsiloxane)-(80-85% dimethylsiloxane) copolymer |
| 90 milligrams | dicumyl peroxide |

The fluorinated silicone copolymer was obtained as product code FMS-736 (from Gelest, Inc., Morrisville, PA, USA). One drop of the solution was applied to the silicone coupon 4B. Then, Sample 4B was subjected to an environment of inert argon having a temperature of 160° C. for a time period of 2 hours. Then, Sample 4B was rinsed twice with hexamethydisiloxane. The sample was then blown with air until dry. The solution modified the PARYLENE HT® at the surface, resulting in the formation of a slippery omniphobic covalently attached liquid chemically bonded thereto. The slippery omniphobic covalently attached liquid includes chains of the fluorinated silicones copolymer from the solution.

The contact angle of the dodecane in the presence of ethylene glycol on the slippery omniphobic covalently attached liquid of the modified parylene C of Sample 4B was measured to be 4°, which is a decrease in about 55° compared to the layer of non-modified parylene C of Sample 4A.

A liquid lens was prepared with parylene C as the insulating layer. The insulating layer was then contacted with the solution used for Sample 4B and subsequently heated, rinsed, and dried in the same manner as Sample 4B. The insulating layer thus became parylene C with chains of the polydimethylsiloxane chemically bonded thereto forming a slippery omniphobic covalently attached liquid. The slippery omniphobic covalently attached liquid provided the surface of the of the insulating layer. A first liquid and a second liquid were added and a top outer layer applied to form the liquid lens. The first liquid and the second liquid were in contact with the surface that the slippery omniphobic covalently attached liquid provided.

An electro-optical curve was generated based on measurements of the liquid lens—more specifically, both optical power and wavefront error were measured and graphed as a function of applied voltage. The maximum hysteresis recorded in the operating range of −5 Diopter to +13 Diopter of the liquid lens was 0.1 diopter.

Figure 4:
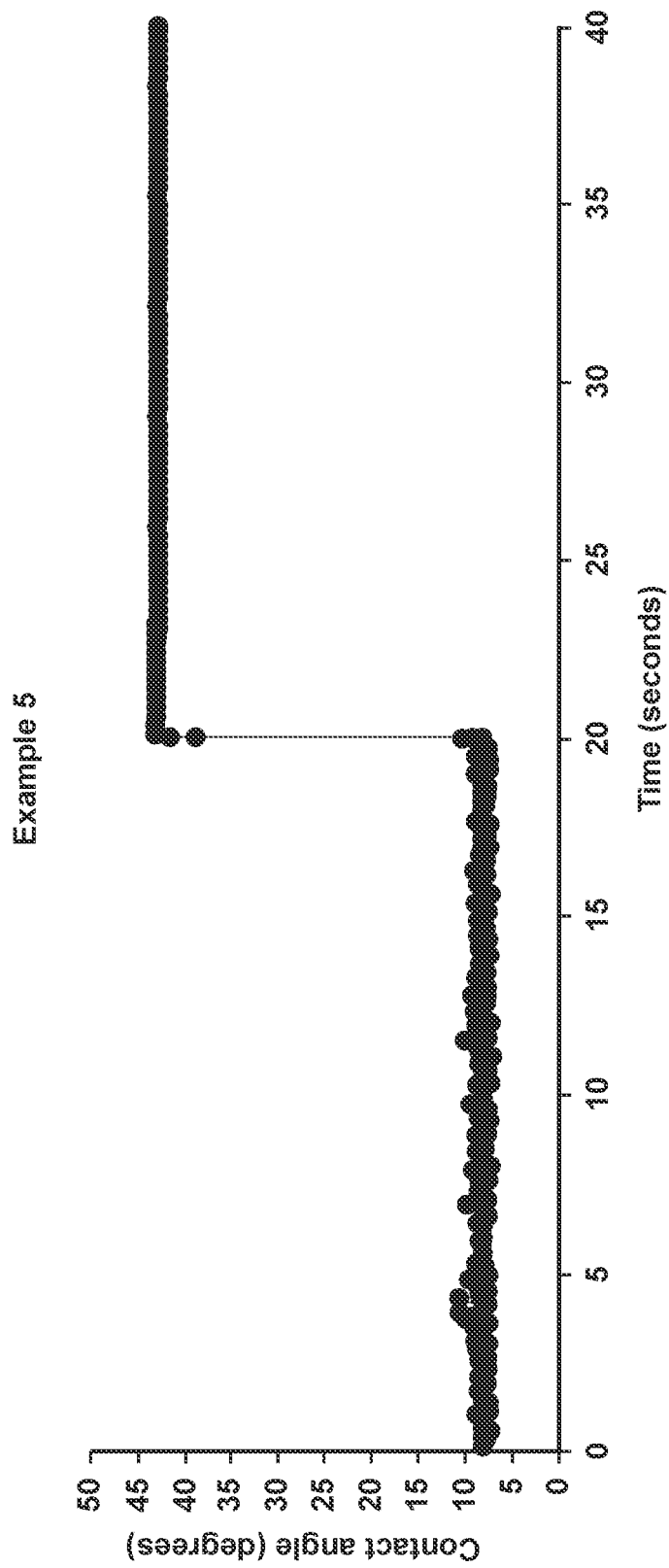
FIG. 4 is a graph pertaining to an Example 5 that plots contact angle as a function of time for a liquid disposed over a layer of poly(para-xylylene) before and after direct current electrical power is applied, illustrating minimal contact angle variation over time.

Example 5—For Example 5, and in reference to FIG. 4, the contact angle of water on parylene N as a function of time was measured for before and after application of direct current electrical power. The results were graphed and are reproduced at FIG. 2. The application of direct current began at the 20 second mark. The contact angle of about 43 degrees occurred nearly instantaneously and the contact angle showed little variation afterwards.

Figure 5:
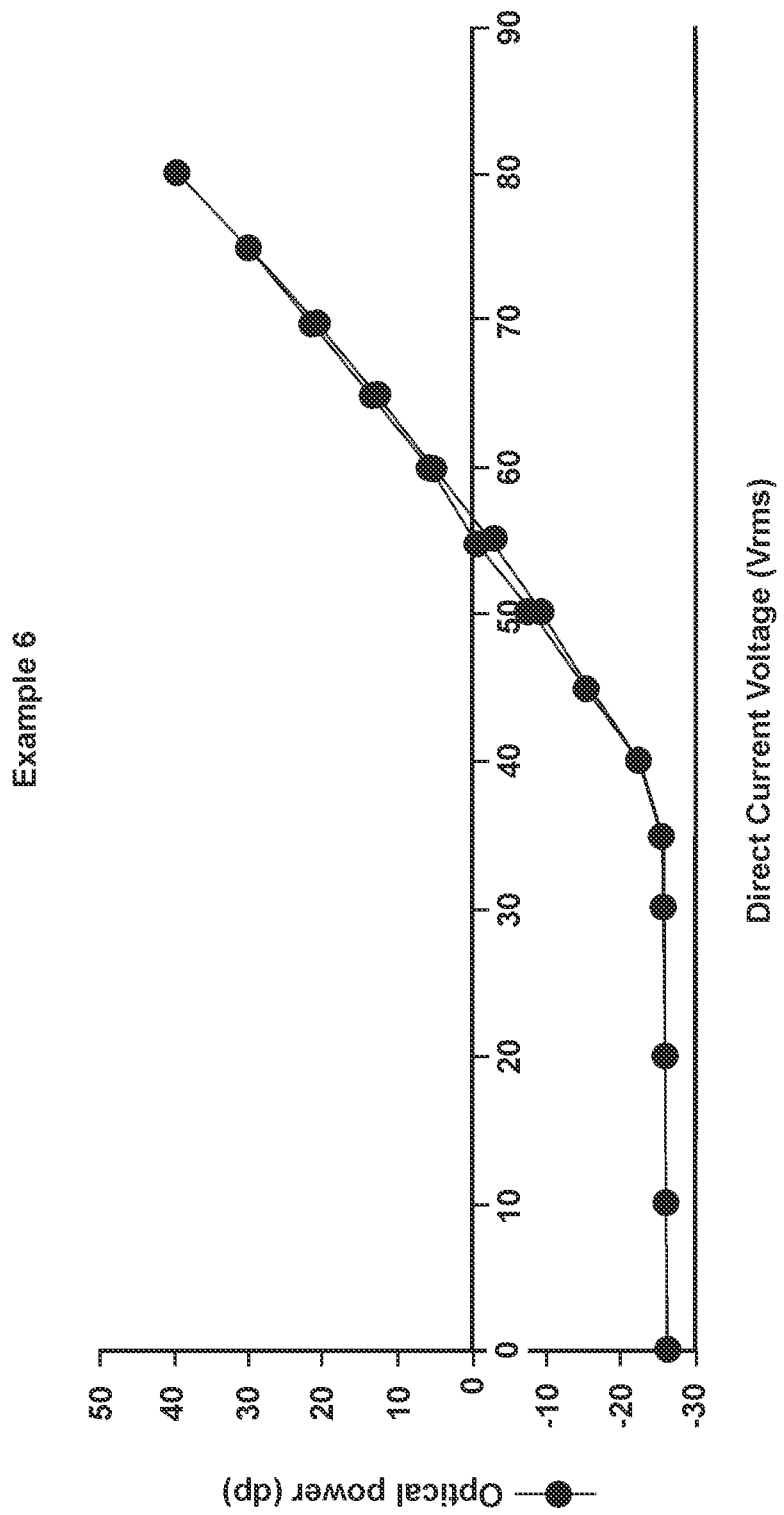
FIG. 5 is a graph pertaining to an Example 6 that plots optical power as a function of voltage, using direct current electrical power, applied for the liquid lens of FIG. 1 that uses a poly(para-xylylene) as the insulating layer, illustrating responsive changes in optical power as a function of varying voltage with minimal hysteresis.

Example 6—For Example 6, and in reference to FIG. 5, a liquid lens was formed with water as the conductive liquid, oil as the insulating liquid, and parylene N as the insulating layer. Varying voltages were applied using direct current to manipulate the interface between the water and the oil, and the optical power of the interface (lens) was measured as a function of the varying voltages. The results were graphed, and the graph is reproduced as FIG. 5. The graph illustrates a functioning liquid lens with optical power related linearly to applied voltage. The graph also reveals minimal hysteresis in optical power when increasing voltage is compared with decreasing voltage. Examples 5 and 6 indicate that a liquid lens incorporating a high quality factor polymeric material, such as parylene N, as the insulating layer can perform well when actuated with direct current electrical power or low frequency alternating current electrical power. It is believed that modification of the parylene N to include a slippery omniphobic covalently attached liquid chemically bonded thereto would not negatively affect the response to varying voltages or hysteresis.

Figure 6:
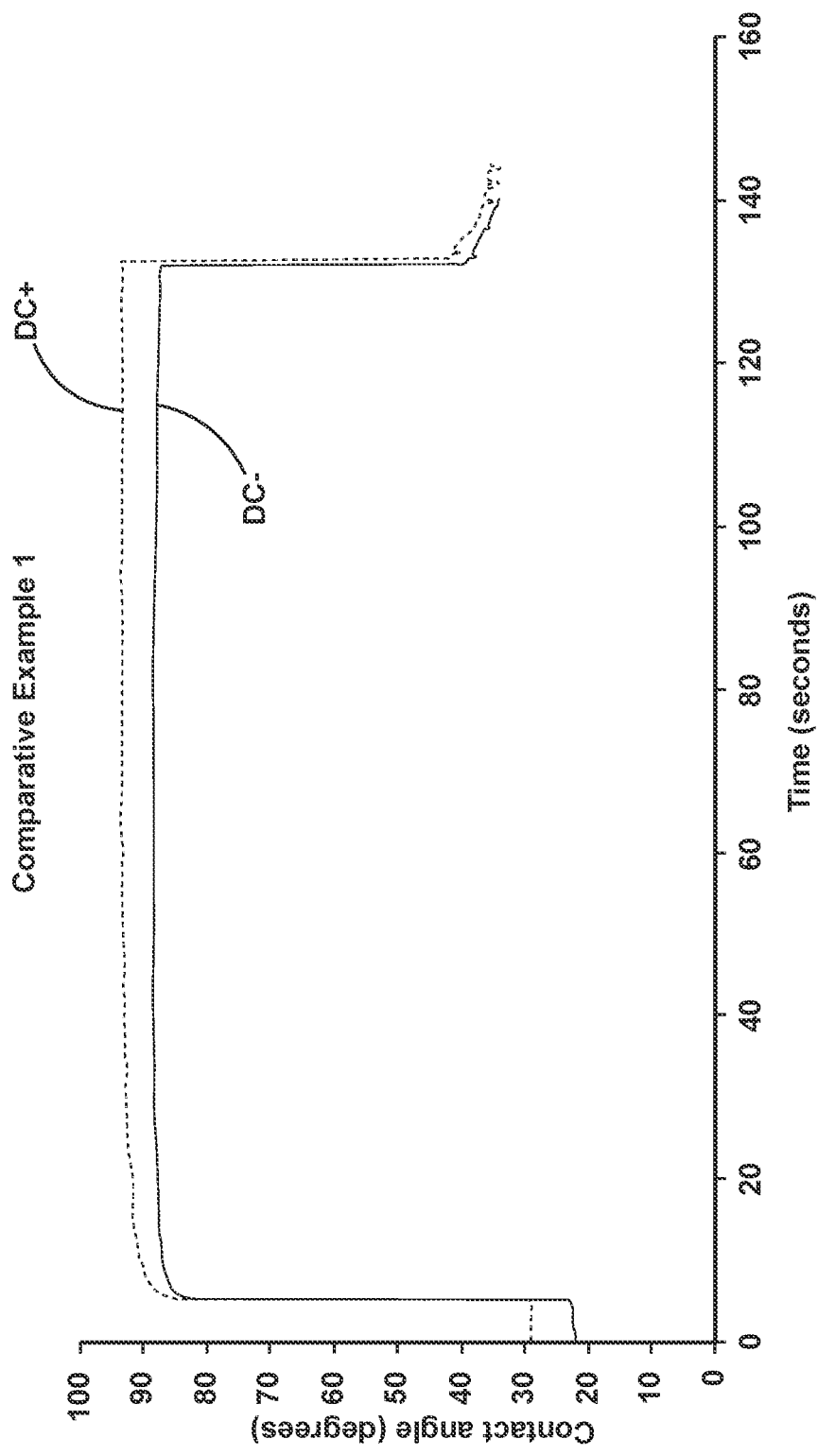
FIG. 6 is a graph pertaining to a Comparative Example 1 that plots contact angle as a function of time (for both negative voltage direct current and positive voltage direct current) for a liquid on a poly(para-xylylene) not modified to include a slippery omniphobic covalently attached liquid that is chemically bonded thereto, illustrating contact angle varying considerably over time.

Comparative Example 1—For Comparative Example 1, and in reference to FIG. 6, the contact angle of water on parylene C (covered by a hydrophobic layer of Cytop®—a fluoropolymer) as a function of time was measured before and after application of direct current electrical power (both negative and positive voltage). The results were graphed and reproduced at FIG. 3. The application of direct current began at about the 5 second mark. Under application of positive voltage direct current, the contact angle rose quickly to about 87 degrees but then slowly increased to about 94 degrees until the 60 seconds mark. Under application of negative voltage direct current, the contact angle rose quickly to about 85 degrees but then slowly increased to about 89 degrees at about the 60 seconds mark and then slowly decreased until the direct current ceased to be applied at about the 135 seconds mark. The variability in contact angle as a function of time for parylene C under application of direct current contrasts with the steady contact angle as a function of time for parylene N. The variability in contact angle as a function of time for parylene C is thought to be a consequence of polarization of the dipoles, and is the same mechanism that produces the dielectric heat loss under application of alternating current. Parylene N does not undergo the same polarization as reflected in the much lower loss tangent value compared to parylene C under application of alternating current, and as reflected in the very fast and stable contact angle respond to applied direct current. In short, parylene N is quickly polarized and parylene C is not, making parylene N suitable for use as the insulating layer in a liquid lens with direct current applications and parylene C unsuitable.

What is claimed is:
1. A liquid lens comprising:
a first liquid and a second liquid disposed within a containment region, the first liquid and the second liquid forming an interface between the first liquid and the second liquid;
an electrode; and
an insulating layer separating the electrode from the first liquid and the second liquid, the insulating layer comprising a polymeric material and a slippery omniphobic covalently attached liquid that is chemically bonded to the polymeric material, the slippery omniphobic covalently attached liquid providing a surface contacting one or more of the first liquid and the second liquid.
2. The liquid lens of claim 1, wherein the polymeric material of the insulating layer comprises a poly(para-xylylene).
3. The liquid lens of claim 1, wherein the polymeric material of the insulating layer comprises repeating units of the following formula

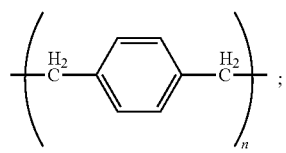

4. The liquid lens of claim 1, wherein
the polymeric material of the insulating layer comprises repeating units of the following formula

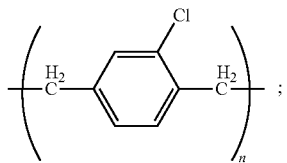

and n is an integer.

5. The liquid lens of claim 1, wherein
the polymeric material of the insulating layer comprises repeating units of the following formula

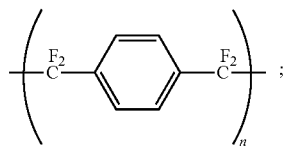

and n is an integer.

6. The liquid lens of claim 1, wherein
the slippery omniphobic covalently attached liquid comprises silicone chains bound to repeating units of the polymeric material.

7. The liquid lens of claim 1, wherein
the slippery omniphobic covalently attached liquid comprises polyolefin or long alkyl chains bound to repeating units of the polymeric material.

8. The liquid lens of claim 1, wherein
the insulating layer comprises repeating units are represented by one or more of the following formulas:

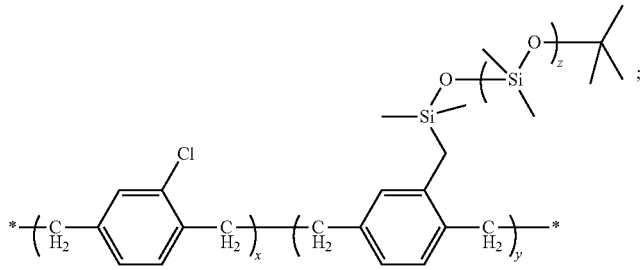

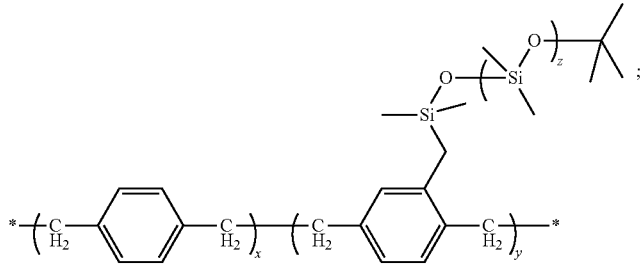

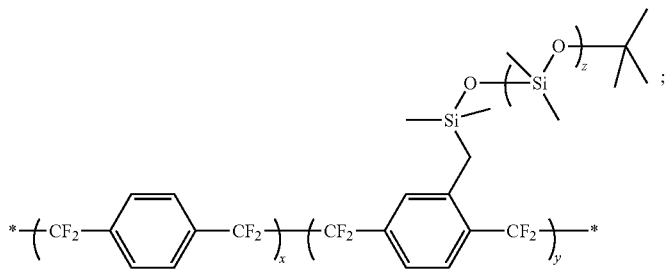

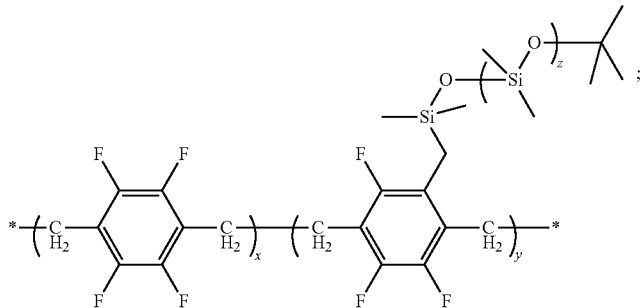

-continued
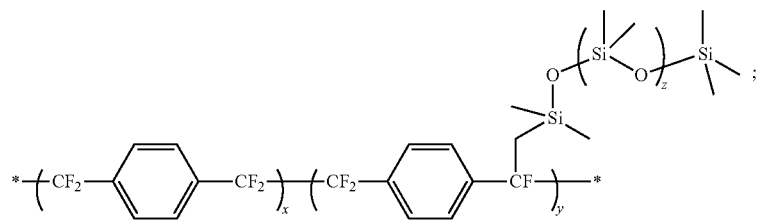
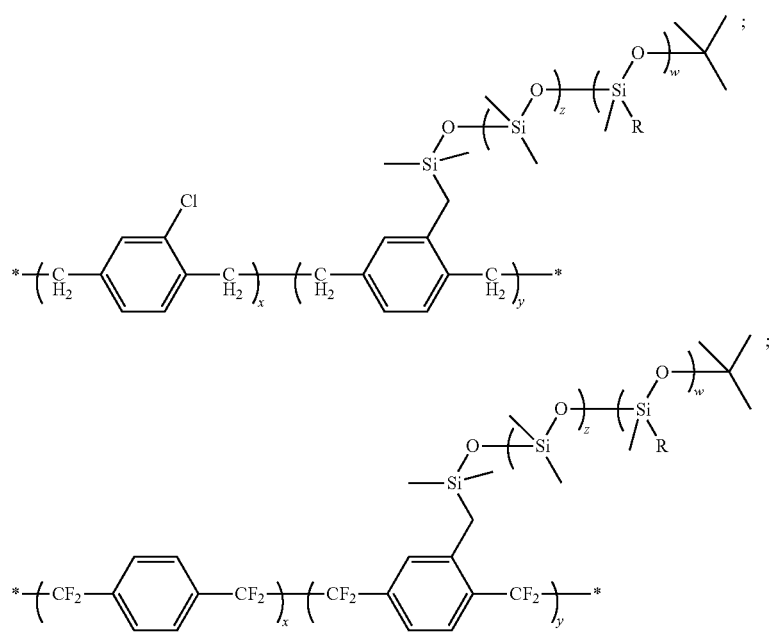
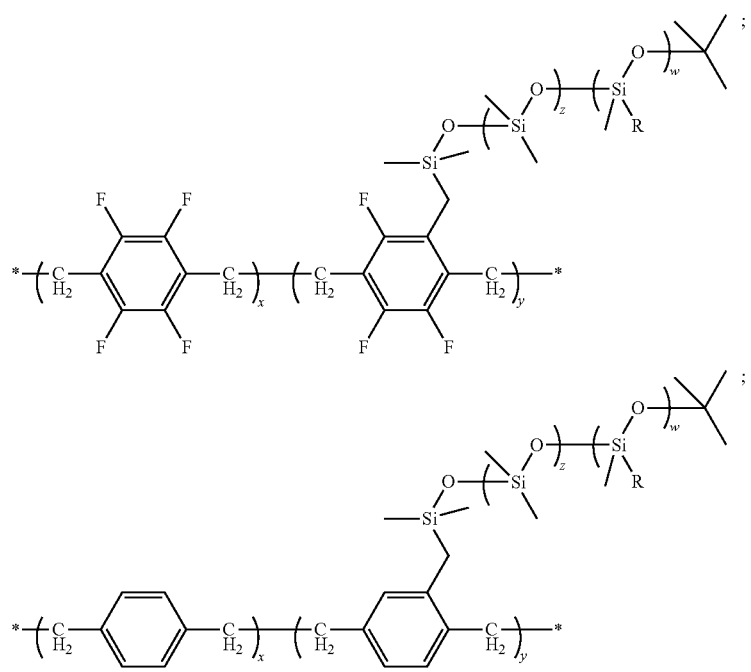

-continued
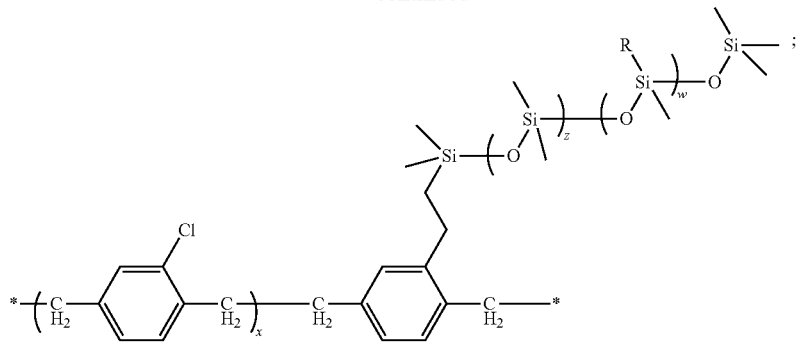
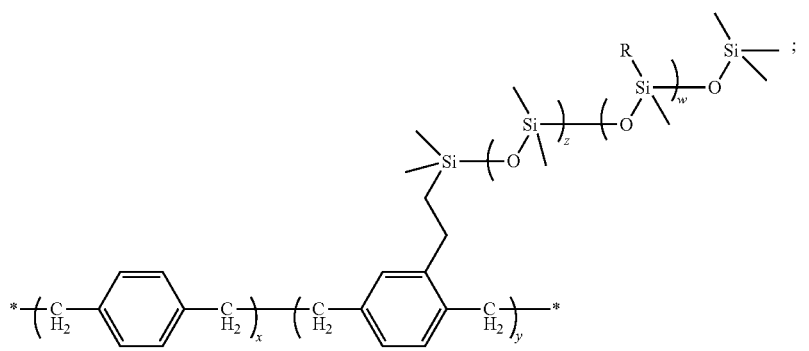
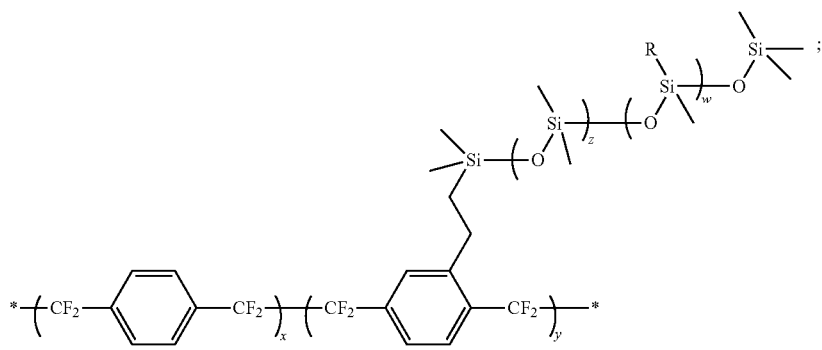
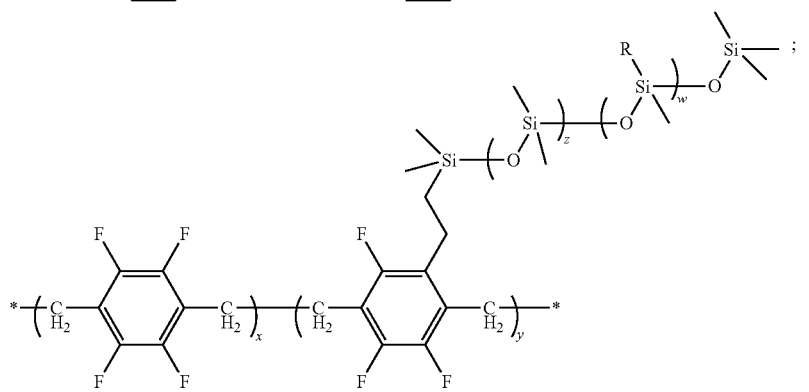
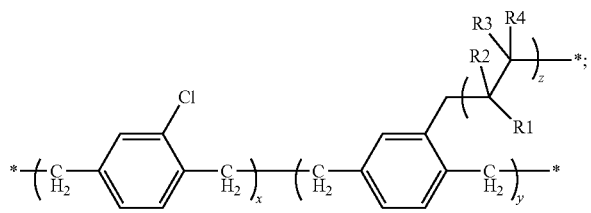

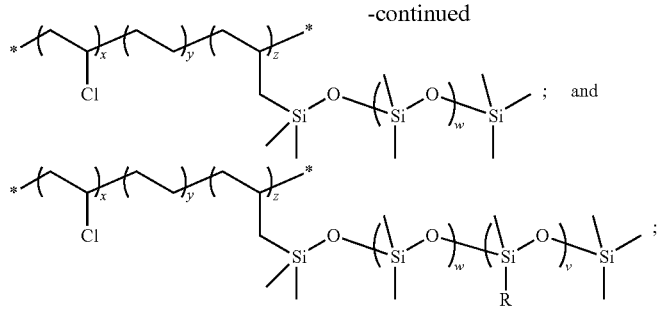

v, w, x, y, and z are integers greater than 1; and

R, R1, R2, R3, and R4 comprise any one of (i) an hydrogen, (ii) an alkyl chain, (iii) a fluorinated alkyl moiety.

9. The liquid lens of claim 1, wherein
the first liquid is an insulating or non-polar liquid;
the second liquid is a conductive or polar liquid; and
the first liquid in the presence of the second liquid forms a contact angle of 20° or less on the insulating layer.

10. The liquid lens of claim 1, wherein
the liquid lens is actuated under (i) direct current or (ii) alternating current having a frequency of less than or equal to 0.1 Hz; and
the insulating layer comprises a quality factor, measured under alternating current having a frequency of 1 kHz, of at least 200.

11. A liquid lens comprising:
a first liquid and a second liquid disposed within a containment region, the first liquid and the second liquid forming an interface between the first liquid and the second liquid;
an electrode; and
an insulating layer separating the electrode from the first liquid and the second liquid;
wherein, the liquid lens is actuated under either (i) direct current or (ii) alternating current having a frequency of less than or equal to 0.1 Hz;
wherein the insulating layer comprises a slippery omniphobic covalently attached liquid; and
wherein the slippery omniphobic covalently attached liquid comprises a surface energy, and polar part of the surface energy is less than or equal to 1 mN/m.

12. The liquid lens of claim 11, wherein
the insulating layer further comprises a polymeric material, the slippery omniphobic covalently attached liquid is chemically bonded to the polymeric material, and the polymeric material comprises the polymeric material of the insulating layer comprises a poly(para-xylylene).

13. The liquid lens of claim 12, wherein
the poly(para-xylylene) has repeating units of one or more of the following formulas

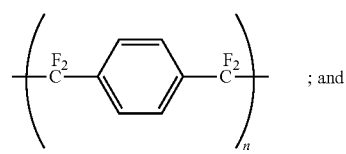

and n is an integer.

14. The liquid lens of claim 12, wherein
the slippery omniphobic covalently attached liquid providing a surface contacting one or more of the first liquid and the second liquid.

15. The liquid lens of claim 11, wherein
the insulating layer or the liquid lens displaying quality factor, measured under alternating current having frequency of 1 kHz, of at least 200.

16. The liquid lens of claim 14, wherein
the slippery omniphobic covalently attached liquid comprises silicone chains, polyolefin chains, or long alkyl chains bound to repeating units of the polymeric material.

17. The liquid lens of claim 14, wherein
the slippery omniphobic covalently attached liquid that is chemically bonded to the polymeric coating comprises a thickness, and the thickness is less than or equal to 25 nm.

18. The liquid lens of claim 11, wherein
the first liquid is an insulating or non-polar liquid; and
dodecane on the surface in the presence of a 0.1 w/w potassium acetate in ethylene glycol forms a contact angle of less than or equal to 20° relative to the surface of the insulating layer.

19. A modified polymer comprising:
a polymeric material and a slippery omniphobic covalently attached liquid that is chemically bonded to the polymeric material, wherein the slippery omniphobic covalently attached liquid comprises a surface energy, and a polar part of the surface energy is less than or equal to 1 mN/m.

20. The modified polymer of claim 19, wherein
the polymeric material of the insulating layer comprises a poly(para-xylylene).

21. The modified polymer of claim 19, wherein
the surface energy is less than or equal to 25 mN/m.

22. The modified polymer of claim 19, wherein
the slippery omniphobic covalently attached liquid provides a surface; and
dodecane on the surface in the presence of a 0.1 w/w potassium acetate in ethylene glycol forms a contact angle relative to the surface of less than or equal to 20°.

23. The modified polymer of claim 19, wherein the modified polymer comprises repeating units represented by one or more of the following formulas:
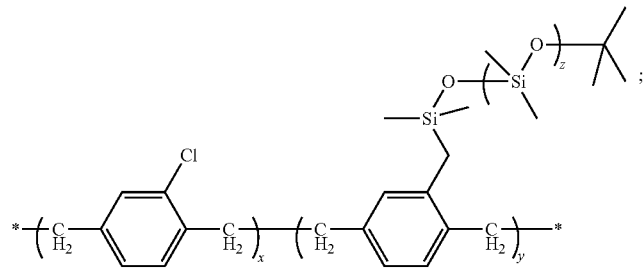
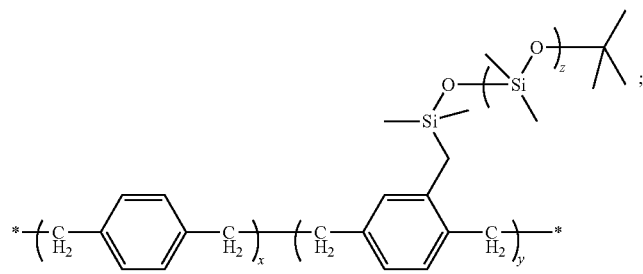
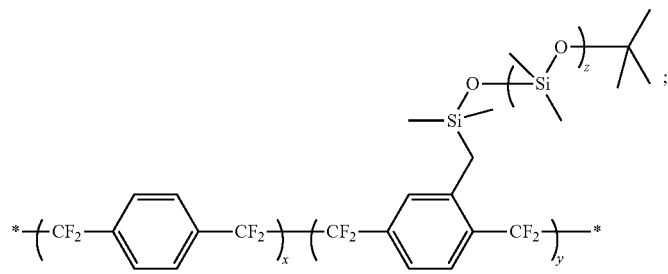
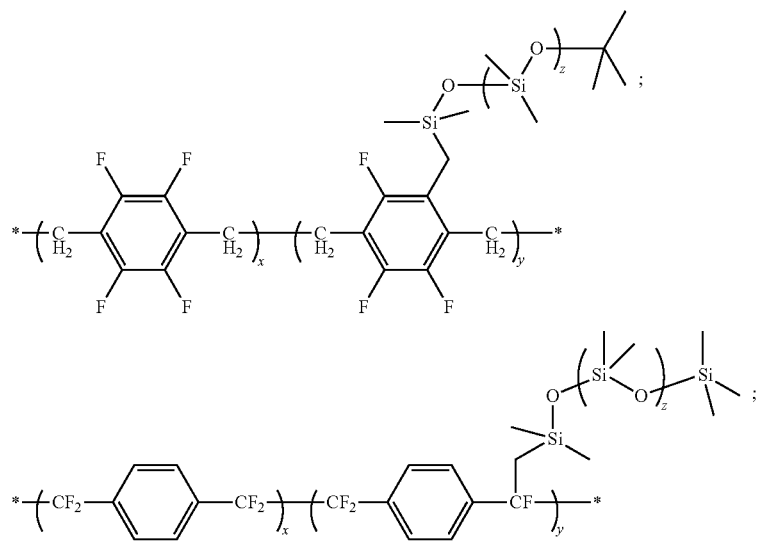

-continued
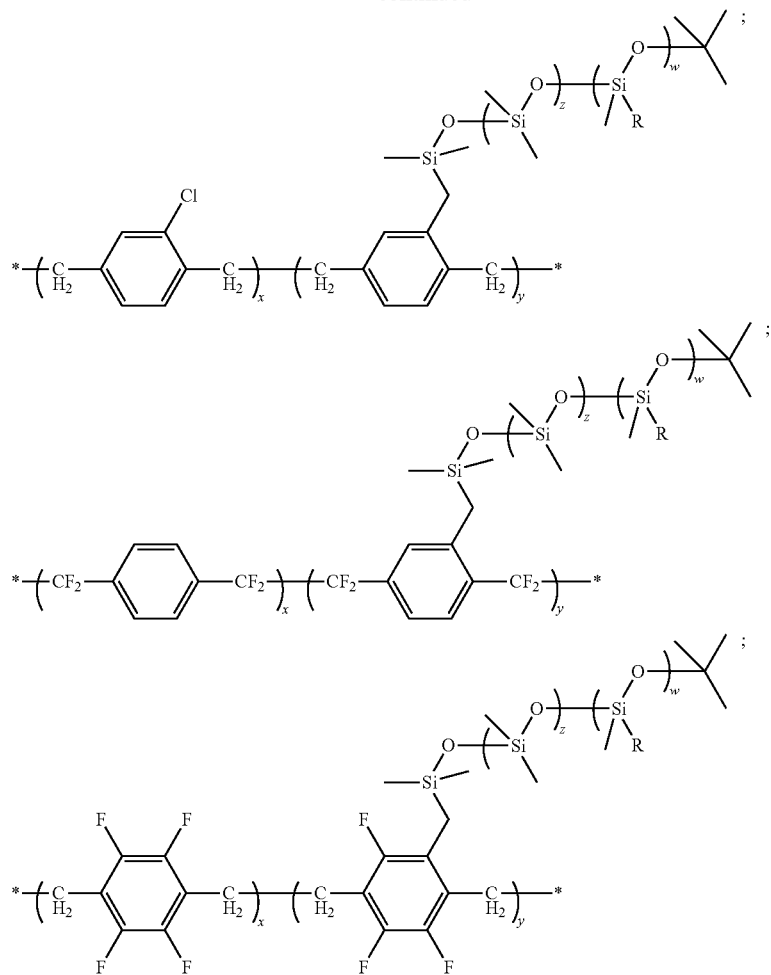
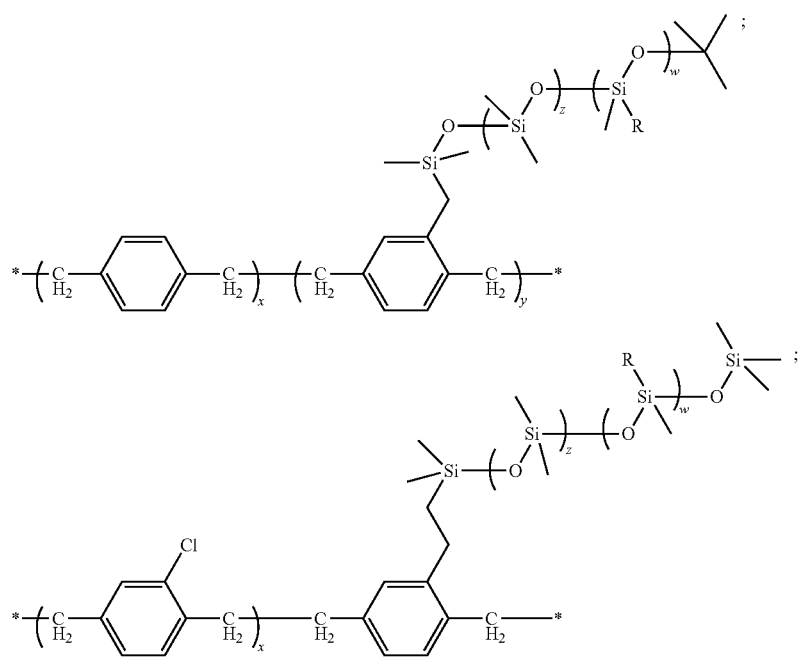

-continued
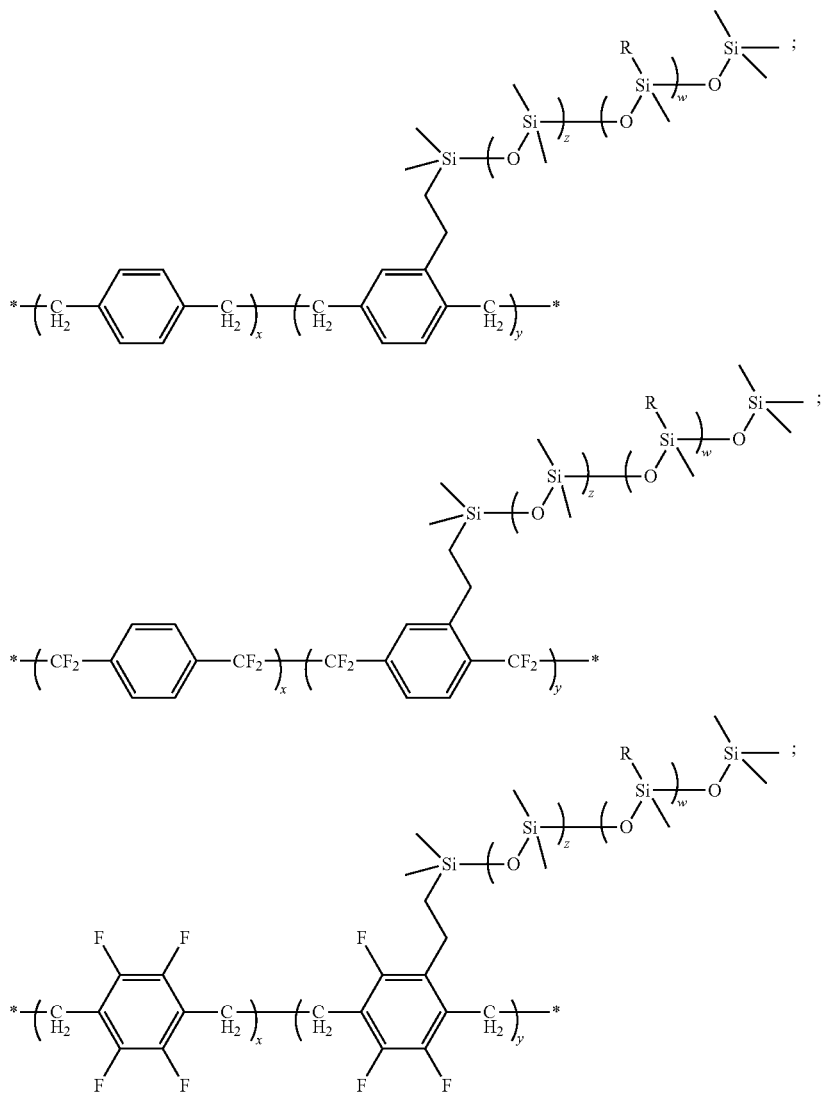
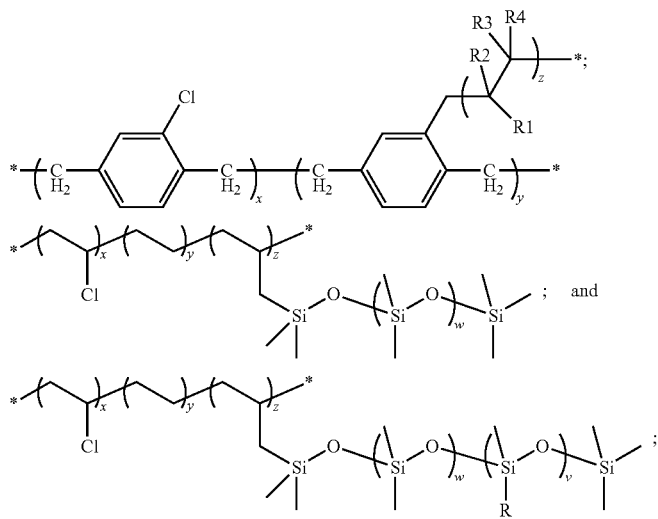

v, w, x, y, z are integers greater than 1; and
R, R1, R2, R3, R4 comprises any one of (i) an hydrogen, (ii) an alkyl chain, (iii) a fluorinated alkyl moiety.

* * * * *